United States Patent
Sugama

(10) Patent No.: US 9,177,354 B2
(45) Date of Patent: Nov. 3, 2015

(54) RENDERING APPARATUS, RENDERING METHOD, AND COMPUTER PRODUCT

(71) Applicant: FUJITSU LIMITED, Kawasaki-shi, Kanagawa (JP)

(72) Inventor: Yasushi Sugama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/086,028

(22) Filed: Nov. 21, 2013

(65) Prior Publication Data

US 2014/0152681 A1  Jun. 5, 2014

(30) Foreign Application Priority Data

Dec. 4, 2012  (JP) ................................ 2012-265825

(51) Int. Cl.
| | | |
|---|---|---|
| G06F 12/02 | (2006.01) | |
| G06T 1/60 | (2006.01) | |
| G06T 11/40 | (2006.01) | |

(52) U.S. Cl.
CPC .. *G06T 1/60* (2013.01); *G06T 11/40* (2013.01)

(58) Field of Classification Search
None
See application file for complete search history.

(56) References Cited

U.S. PATENT DOCUMENTS

| 6,542,255 | B1 | 4/2003 | Nakamura | |
|---|---|---|---|---|
| 7,102,646 | B1 * | 9/2006 | Rubinstein et al. | 345/570 |
| 8,836,710 | B2 * | 9/2014 | Redshaw | 345/530 |
| 2004/0141650 | A1 * | 7/2004 | Hansson et al. | 382/232 |
| 2008/0117212 | A1 * | 5/2008 | Woo et al. | 345/427 |
| 2009/0154834 | A1 * | 6/2009 | Ban et al. | 382/284 |

FOREIGN PATENT DOCUMENTS

| JP | 2000-238349 | 9/2000 |
|---|---|---|
| JP | 2001-047673 | 2/2001 |
| JP | 2007-079934 | 3/2007 |
| JP | 2009-212826 | 9/2009 |

* cited by examiner

*Primary Examiner* — Jacinta M Crawford
(74) *Attorney, Agent, or Firm* — Fujitsu Patent Center

(57) ABSTRACT

A rendering apparatus acquires graphic information of a figure to be rendered in a rendering area; specifies for each division area of the rendering area, graphic information of a figure to be rendered in the division area; calculates based on data size of the specified graphic information and for each division area, total data size of graphic information of the figure to be rendered in the division area; selects a division area as a rendering destination, based on each calculated total data size and a data capacity of a memory area to which graphic information is to be stored that is among the acquired graphic information and for the figure to be rendered; writes to the memory area, the graphic information of the figure to be rendered in the selected division area; and generates based on the written graphic information, an image for the selected division area.

6 Claims, 21 Drawing Sheets

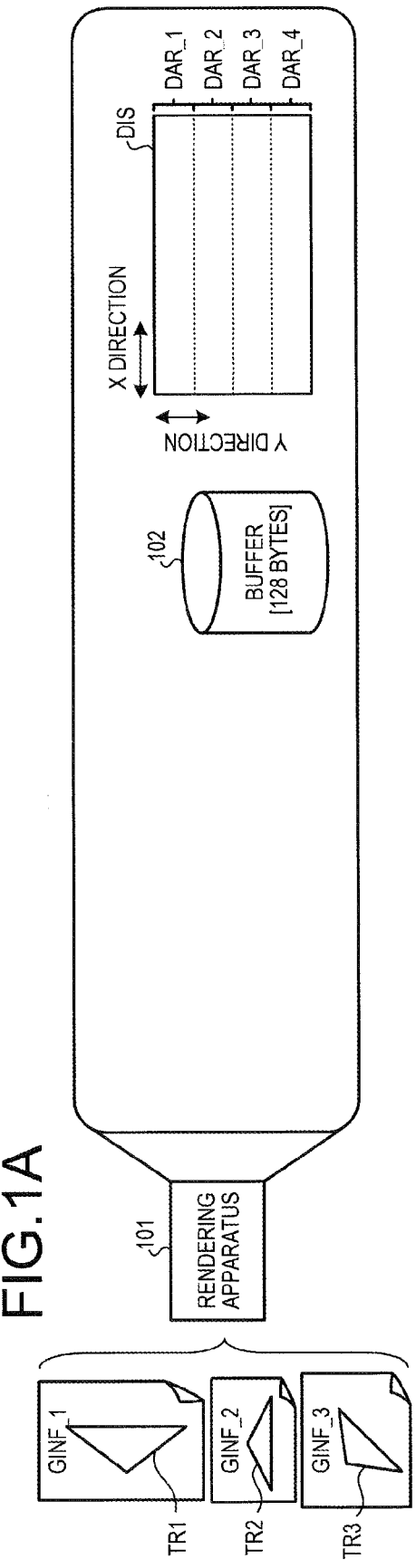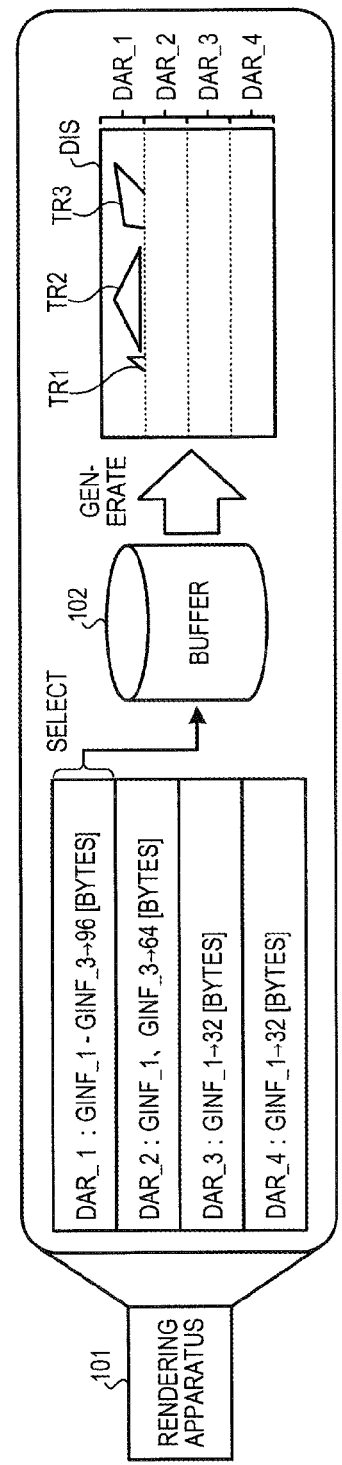

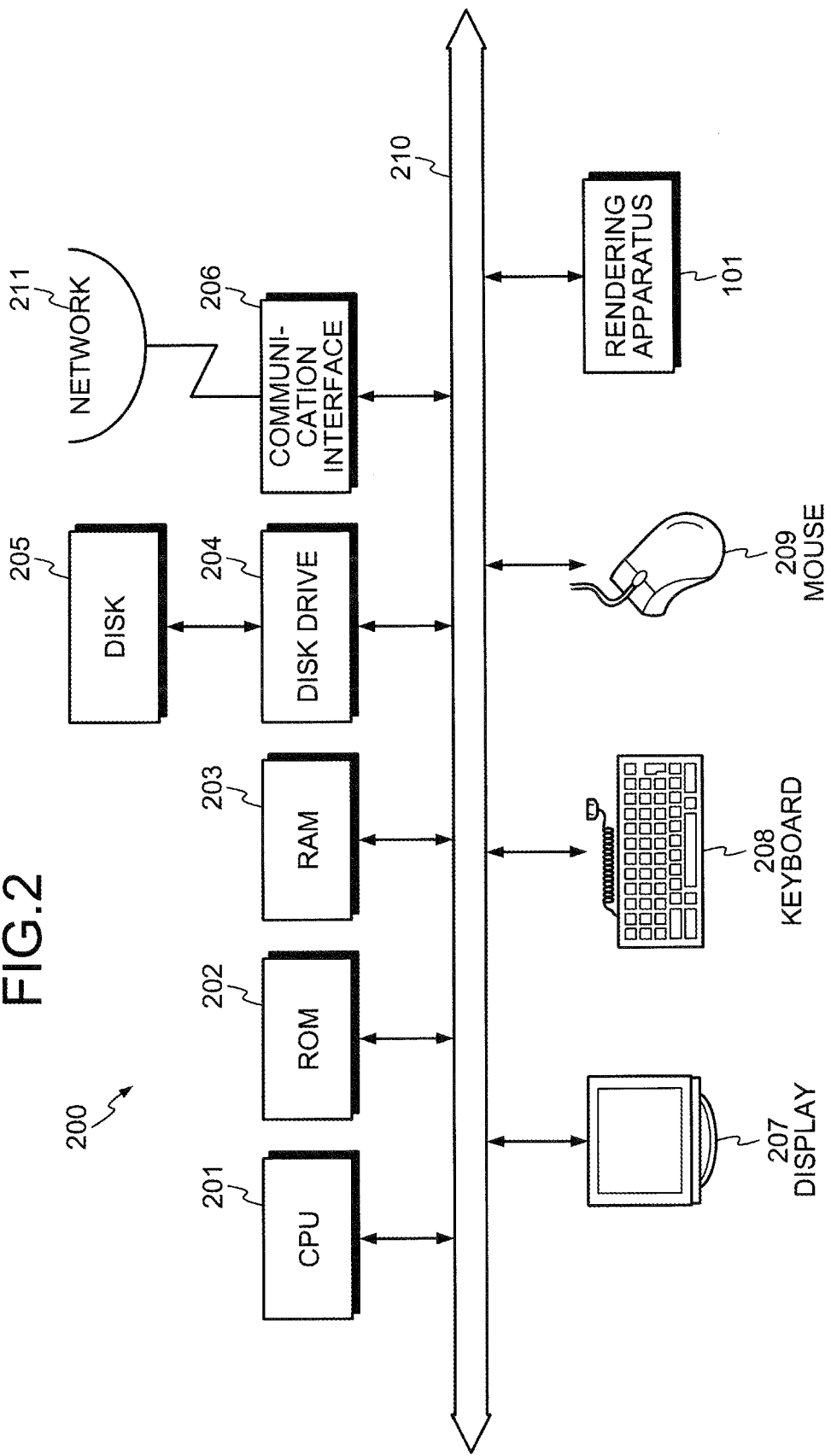

FIG.7

GRAPHIC INFORMATION SIZE LIST ~411

| POSITION OF DIVISION AREA | DATA SIZE OF GRAPHIC INFORMATION TO BE RENDERED IN DIVISION AREA [BYTES] | |
|---|---|---|
| Y=0 - 59 (DAR_1) | 0 | ~701-1 |
| Y=60 - 119 (DAR_2) | 0 | ~701-2 |
| Y=120 - 179 (DAR_3) | 0 | ~701-3 |
| Y=180 - 239 (DAR_4) | 0 | ~701-4 |
| Y=240 - 299 (DAR_5) | 0 | ~701-5 |
| Y=300 - 359 (DAR_6) | 0 | ~701-6 |
| Y=360 - 419 (DAR_7) | 0 | ~701-7 |
| Y=420 - 479 (DAR_8) | 0 | ~701-8 |

| DATA SIZE OF RENDERING COMMAND OTHER THAN GRAPHIC INFORMATION [BYTES] | 0 | ~702 |
|---|---|---|
| TOTAL DATA SIZE [BYTES] | 0 | ~703 |

FIG.8

GRAPHIC INFORMATION SIZE LIST ~411

| POSITION OF DIVISION AREA | DATA SIZE OF GRAPHIC INFORMATION TO BE RENDERED IN DIVISION AREA [BYTES] |
|---|---|
| Y=0 - 59 (DAR_1) | 32 |
| Y=60 - 119 (DAR_2) | 32 |
| Y=120 - 179 (DAR_3) | 32 |
| Y=180 - 239 (DAR_4) | 0 |
| Y=240 - 299 (DAR_5) | 0 |
| Y=300 - 359 (DAR_6) | 0 |
| Y=360 - 419 (DAR_7) | 0 |
| Y=420 - 479 (DAR_8) | 0 |

701-1, 701-2, 701-3, 701-4, 701-5, 701-6, 701-7, 701-8

| DATA SIZE OF RENDERING COMMAND OTHER THAN GRAPHIC INFORMATION [BYTES] |
|---|
| 0 |

~702

| TOTAL DATA SIZE [BYTES] |
|---|
| 96 |

GRAPHIC INFORMATION SIZE LIST ~ 411

| POSITION OF DIVISION AREA | DATA SIZE OF GRAPHIC INFORMATION TO BE RENDERED IN DIVISION AREA [BYTES] | |
|---|---|---|
| Y=0 - 59 (DAR_1) | 384 | ~ 701-1 |
| Y=60 - 119 (DAR_2) | 256+384=640 | ~ 701-2 |
| Y=120 - 179 (DAR_3) | 224+640=864 | ~ 701-3 |
| Y=180 - 239 (DAR_4) | 128+864=992 | ~ 701-4 |
| Y=240 - 299 (DAR_5) | 96+992=1088 | ~ 701-5 |
| Y=300 - 359 (DAR_6) | 64+1088=1152 | ~ 701-6 |
| Y=360 - 419 (DAR_7) | 32+1152=1184 | ~ 701-7 |
| Y=420 - 479 (DAR_8) | 32+1184=1216 | ~ 701-8 |

| DATA SIZE OF RENDERING COMMAND OTHER THAN GRAPHIC INFORMATION [BYTES] | 256 | ~ 702 |
|---|---|---|
| TOTAL DATA SIZE [BYTES] | 1472 | ~ 703 |

FIG.18

GRAPHIC INFORMATION SIZE LIST ~411

| POSITION OF DIVISION AREA | DATA SIZE OF GRAPHIC INFORMATION<br>DATA SIZE OF GRAPHIC INFORMATION TO BE RENDERED IN DIVISION AREA [BYTES] | |
|---|---|---|
| - | 0 | ~1601-1 |
| - | 0 | ~1601-2 |
| - | 0 | ~1601-3 |
| - | 0 | ~1601-4 |
| - | 0 | ~1601-5 |
| Y=360 - 419 (DAR_7) | 256 | ~1601-7 |
| Y=360 - 479 (DAR_7_8) | 384 | ~1601-8 |

| DATA SIZE OF RENDERING COMMAND OTHER THAN GRAPHIC INFORMATION [BYTES] | |
|---|---|
| 256 | ~1602 |

| TOTAL DATA SIZE [BYTES] | |
|---|---|
| 1408 | ~1603 |

RENDERING APPARATUS, RENDERING METHOD, AND COMPUTER PRODUCT

CROSS REFERENCE TO RELATED APPLICATIONS

This application is based upon and claims the benefit of priority of the prior Japanese Patent Application No. 2012-265825, filed on Dec. 4, 2012, the entire contents of which are incorporated herein by reference.

FIELD

The embodiments discussed herein are related to a rendering apparatus, a rendering method, and a rendering program.

BACKGROUND

A conventional technique of rendering a figure respectively in areas into which a rendering area of a graphic screen is divided, is known. For example, according to a known technique, when the required clip size exceeds the available clip size, a current black-and-white image rendering command is divided into divided black-and-white image rendering commands and a current color image rendering command is divided according to areas corresponding to the divided black-and-white image rendering commands. According to another known technique, a rendering command for rendering in one page is divided into multiple bands, band heights are determined temporarily in order for each band to keep band heights equal to or lower than a threshold value, and a list of graphic displays for one page is distributed to multiple bands. According to still another known technique, a print command to a printer is generated based on rendering range information created by dividing a rendering range, in which a figure is to be rendered, into multiple ranges and on bit-map data written in an intermediate language based on a print command from an application program, and the generated print command is sent to the printer. According to yet another known technique, when a rendering memory area for an application program cannot be established, a rendering memory area for a priority-given application program is established preferentially and rendering memory areas for other application programs are established according to a value obtained by subtracting the established memory area from the entire rendering memory area (see, for example, Japanese Laid-Open Patent Publication Nos. 2007-079934, 2000-238349, 2001-047673, and 2009-212826.

According to the conventional techniques, if an image is generated for each area, the memory capacity of a buffer temporarily storing a rendering command and an image may decrease. As a result, the writing of all the rendering commands to the buffer may become impossible, making proper rendering of an image difficult.

SUMMARY

According to an aspect of an embodiment, a rendering apparatus includes a processor configured to acquire graphic information including coordinates positions of vertices of a figure to be rendered in a rendering area; specify based on the acquired graphic information and for each division area created by dividing the rendering area, graphic information of a partial figure or entire figure to be rendered in the division area; calculate based on data size of the specified graphic information and for each division area, total data size of graphic information of the partial figure or entire figure to be rendered in the division area; select from among the division areas, a division area to be used as a rendering destination for the figure to be rendered, the division area being selected based on the total data size of the graphic information calculated for the each division area and based on a data capacity of a memory area to which graphic information that is among the acquired graphic information and that is for a figure to be rendered is to be stored; write to the memory area, the graphic information of the figure that is to be rendered in the division area selected to be used as the rendering destination; and generate based on the graphic information written to the memory area, an image for the division area to be used as the rendering destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A, 1B, and 1C is an explanatory diagram of an example of operation of a rendering apparatus according to a first embodiment;

FIG. 2 is a block diagram of a hardware configuration of a computer system;

FIG. 7 is an explanatory diagram of an example of the contents of a graphic information size list;

FIG. 8 is an explanatory diagram of an example of updating the graphic information size list according to the first embodiment;

FIG. 10 is an explanatory diagram of an example of updating the graphic information size list according to the first embodiment;

FIG. 18 is an explanatory diagram of an example of updating the graphic information size list according to the second embodiment;

DESCRIPTION OF EMBODIMENTS

Embodiments of a rendering apparatus, a rendering method, and a rendering program will be described in detail with reference to the accompanying drawings.

Figure 1C:
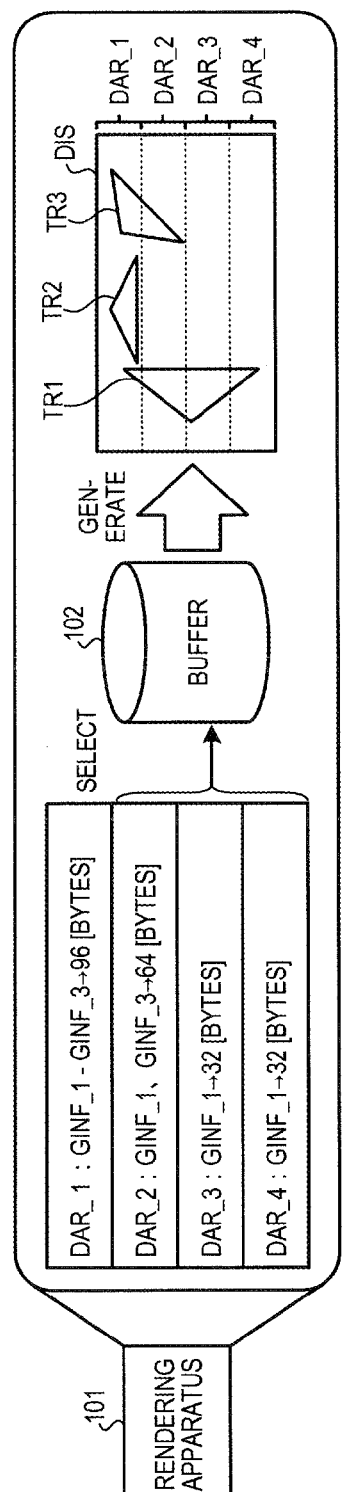

FIGS. 1A, 1B, and 1C is an explanatory diagram of an example of operation of a rendering apparatus according to a first embodiment. A rendering apparatus 101 is a computer included in a computer system. For example, the rendering apparatus 101 executes a rendering command issued by an application program executed by the computer system and outputs an image as an execution result. The computer system displays the output image on the display screen of the computer system, which will be described later with reference to FIG. 2. For example, the rendering apparatus 101 is provided as a graphic processing unit (GPU), etc. The application program is, for example, software that processes three-dimensional images. The application program will hereinafter be referred to as "app".

The rendering apparatus, which renders a three-dimensional image, etc., for example, generates graphic information on the two-dimensional display screen, based on vertex information of a figure issued from the app as a figure rendering command. Based on the generated graphic information, the rendering apparatus generates an image to be displayed on the two-dimensional display screen. For example, the rendering apparatus generates graphic information in a rendering area making up the two-dimensional display screen, using a frame buffer storing the colors of pixels and a depth buffer storing the depths of pixels. The graphic information includes the coordinate positions of vertices of the figure rendered in the rendering area.

The rendering apparatus, therefore, is provided with buffers that temporarily store pixel values, such as the frame buffer and depth buffer, as buffers securing a memory capacity for storage of all the pixels making up the display screen. When the display screen is made up of 640 [pixels]×480 [pixels] and a data size for storage of the color and depth of each pixel is 8 [bytes], a memory capacity of 2.3 [M bytes] must be secured.

The rendering apparatus 101 of the first embodiment specifies a figure rendered in each division area DAR created by dividing a rendering area DIS, and based on the data volume of graphic information of the specified figure, writes graphic information of a selected division area DAR to a buffer 102 such that the graphic information does not exceed the memory capacity of the buffer 102. In this manner, the rendering apparatus 101 enables the memory capacity of the buffer 102 to be reduced while enabling the possibility of proper rendering to be improved.

For example, the rendering apparatus 101 transforms the contents to be written to the buffer 102, from pixel values to graphic information, thereby reducing the data volume. In this case, the data size of graphic information of a figure rendered in a given division area DAR may be so large that the graphic information exceeds the memory capacity of the provided buffer 102. To deal with this problem, the rendering apparatus 101 compares the data volume of graphic information of a figure rendered in each division area DAR with the memory capacity of the buffer 102, selects a division area DAR corresponding to graphic information that does not exceed the memory capacity of the buffer 102, and writes the graphic information to the buffer 102. In this manner, when the data size of graphic information to be written does not exceed the memory capacity of the buffer 102 provided for one division area, the rendering apparatus 101 can perform proper rendering. Thus, the possibility of proper rendering can be improved.

In FIG. 1A, for example, the rendering apparatus 101 divides the rendering area DIS, which is equivalent to the two-dimensional display screen, into four division areas DAR_1 to DAR_4, and generates an image for each of the division areas DAR. The rendering area DIS may be divided along the X coordinates or Y coordinates or along the X and Y coordinates. The rendering apparatus 101 has the buffer 102 in which graphic information of a figure that is to be rendered and included in graphic information is stored. The memory capacity of the buffer 102 of FIGS. 1A, 1B, and 1C is assumed to be 128 [bytes]. In this state, the rendering apparatus 101 acquires graphic information GINF_1 to GINF_3. The graphic information GINF_1 includes the coordinates of apexes of a triangle TR1, which is a figure to be rendered. The figure information GINF_2 includes the coordinates of apexes of a triangle TR2, which is a figure to be rendered. The figure information GINF_3 includes the coordinates of apexes of a triangle TR3, which is a figure to be rendered. The data size of each of the graphic information GINF_1 to GINF_3 is assumed to be 32 [bytes].

In FIG. 1B, based on the graphic information GINF_1 to GINF_3, the rendering apparatus 101 specifies for each of the division areas DAR_1 to DAR_4, graphic information of partial figures or entire figures rendered in each division area. In the example of FIG. 1B, the rendering apparatus 101 specifies the graphic information GINF_1 to GINF_3 of the triangles TR1 to TR3 rendered in the division area DAR_1, using the coordinate positions of vertices of the figures indicated by the graphic information GINF_1 to GINF_3 and the range of the division area DAR_1. In the same manner, the rendering apparatus 101 specifies the graphic information GINF_1 and GINF_3 of the triangles TR1 and TR3 rendered in the division area DAR_2, and specifies the graphic information GINF_1 of the triangle TR1 to be rendered in the division areas DAR_3 and DAR_4.

Subsequently, based on the data size of the graphic information GINF_1 to GINF_3, the rendering apparatus 101 calculates for each of the division areas DAR_1 to DAR_4, the total data size of graphic information of partial figures or entire figures rendered in the division area DAR. For example, the rendering apparatus 101 calculates the total data size of the graphic information GINF_1 to GINF_3 of the triangles TR1 to TR3 rendered in the division area DAR_1, as 32+32+32=96 [bytes]. In the same manner, the rendering apparatus 101 calculates the total data size of the graphic information GINF_1 and GINF_3 of the triangles TR1 and TR3 rendered in the division area DAR_2, as 64 [bytes]. The rendering apparatus 101 also calculates the total data size of the graphic information GINF_1 of the triangle TR1 rendered in the division areas DAR_3 and DAR_4, as 32 [bytes].

Based on the data capacity of the buffer 102 and the total data size of graphic information calculated for each of the division areas DAR_1 to DAR_4, the rendering apparatus 101 then selects a division area DAR to be used as a rendering destination for a figure to be rendered, from among the division areas DAR_1 to DAR_4. In FIG. 1B, the total data size of the graphic information calculated for the division area DAR_1 is 96 [bytes] and the data capacity of the buffer 102 is less than or equal to 128 [bytes]. The rendering apparatus 101, therefore, selects the division area DAR_1 as the rendering destination division area DAR.

After selecting the division area DAR_1, the rendering apparatus 101 writes graphic information GINF_1 to GINF_3 of figures to be rendered in the division area DAR_1, to the buffer 102. The rendering apparatus 101 then generates images for the division area DAR_1, referring to the buffer 102.

In FIG. 1C, after generating the images in the division area DAR_1, the rendering apparatus 101 writes to the buffer 102, graphic information GINF that has not been written to the buffer 102 and corresponds to the division areas DAR_2 to DAR_4. Through these operations, the rendering apparatus 101 enables the memory capacity of the buffer 102 to be reduced while properly rendering the triangles TR1 to TR3 according to a request from the application. The rendering apparatus 101 of the first embodiment will hereinafter be described referring to FIGS. 2 to 14.

FIG. 2 is a block diagram of a hardware configuration of the computer system. As depicted in FIG. 2, the computer system 200 includes a central processing unit (CPU) 201, read-only memory (ROM) 202, random access memory (RAM) 203, a disk drive 204, a disk 205, a communication interface 206, a display 207, a keyboard 208, a mouse 209, and the rendering apparatus 101, respectively connected by a bus 210.

The CPU 201 is a computation processing apparatus that governs overall control of the computer system 200. The ROM 202 is non-volatile memory that stores programs such a boot program. The RAM 203 is volatile memory used as a work area of the CPU 201.

The disk drive 204, under the control of the CPU 201, controls the reading and writing of data with respect to the disk 205. For example, a magnetic disk drive, a solid state drive, and the like may be adopted as the disk drive 204. The disk 205 is non-volatile memory that stores data written thereto under the control of the disk drive 204. For example, when the disk drive 204 is a magnetic disk drive, the disk 205 may be a magnetic disk. When the disk drive 204 is an optical disk drive, the disk 205 may be an optical disk. Further, when the disk drive 204 is a solid state drive, the disk 205 may be semiconductor memory.

The communication interface 206 is a control apparatus that administers an internal interface with a network 211 and controls the input and output of data with respect to other apparatuses. The communication interface 206 is connected, via a communication line, to the network 211, which may be a local area network (LAN), a wide area network (WAN), the Internet, and the like. For example, a modem or a LAN adaptor may be employed as the communication apparatus 206. Further, the computer system 200 may have an optical disk drive, an optical disk, a keyboard, and a mouse.

The display 207 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 207.

The keyboard 208 includes, for example, keys for inputting letters, numerals, and various instructions and performs the input of data. Alternatively, a touch-panel-type input pad or numeric keypad, etc. may be adopted. The mouse 209 is used to move the cursor, select a region, or move and change the size of windows. A track ball or a joy stick may be adopted provided each respectively has a function similar to a pointing device.

Figure 3:
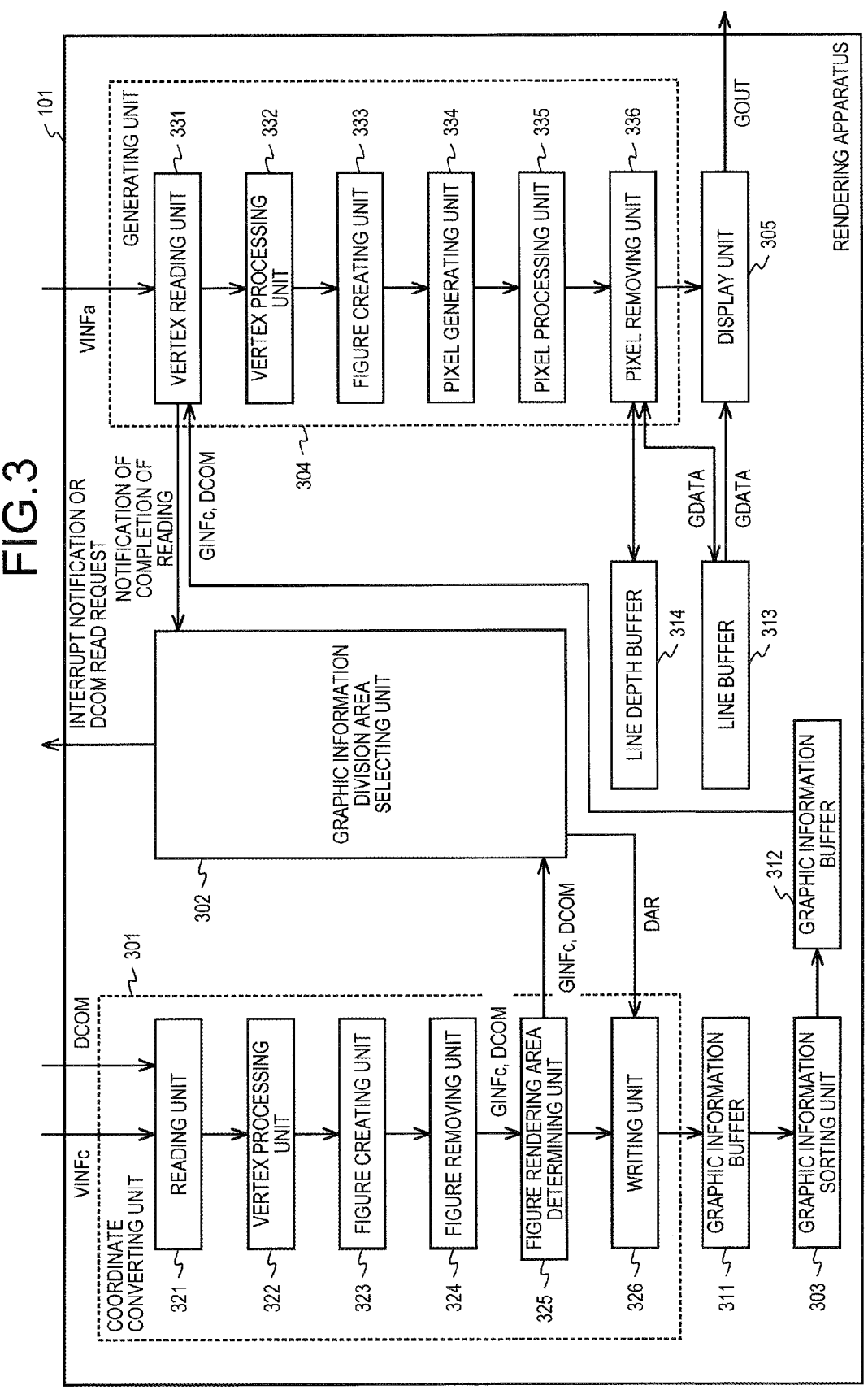
FIG. 3 is a block diagram of an example of a functional configuration of the rendering apparatus.

A functional configuration of the rendering apparatus 101 will be described. FIG. 3 is a block diagram of an example of a functional configuration of the rendering apparatus 101. The rendering apparatus 101 includes a coordinate converting unit 301, a graphic information division area selecting unit 302, a graphic information sorting unit 303, a generating unit 304, and a display unit 305. The rendering apparatus 101 can access a graphic information buffer 311, a graphic information buffer 312, a line buffer 313, and a line depth buffer 314. The buffer 102 of FIGS. 1A, 1B, and 1C is equivalent to the graphic information buffer 311, the graphic information buffer 312, the line buffer 313, and the line depth buffer 314.

The coordinate converting unit 301 includes a reading unit 321, a vertex processing unit 322, a figure creating unit 323, a figure removing unit 324, a figure rendering area determining unit 325, and a writing unit 326. The generating unit 304 includes a vertex reading unit 331, a vertex processing unit 332, a figure creating unit 333, a pixel generating unit 334, a pixel processing unit 335, and a pixel removing unit 336.

The coordinate converting unit 301 executes a graphic process. For example, the coordinate converting unit 301 receives vertex information VINF and a "rendering command DCOM other than graphic information" and generates graphic information GINF of a figure in the rendering area DIS. The figure is, for example, a triangle, and may be a figure other than a triangle. For example, the vertex information VINF includes information of the three-dimensional coordinates of vertices of the figure and information of the colors of the vertices. The details of the vertex information VINF will be described later with reference to FIG. 5. Information of the three-dimensional coordinates of the vertices of a figure will also be referred to as "coordinate information of figure" hereinafter. The "rendering command DCOM other than graphic information" is a command that affects a figure rendered in the rendering area. For example, the rendering command DCOM is issued as a command to rotate the figure or a command to paste an image to the figure.

The graphic information GINF includes information of the vertex numbers of a figure and information of the coordinate positions of a figure in the rendering area DIS. Information of the coordinates of the vertices of a figure in the rendering area DIS will also be referred to as "position information of figure" hereinafter. The details of the graphic information GINF will be described later with reference to FIG. 6.

The coordinate converting unit 301 may receive among the vertex information VINF, the coordinate information of the figure. The coordinate converting unit 301 executes part of the graphic process, using the coordinate information of the vertices of the figure, to generate the graphic information GINF that includes information of the vertex numbers of the figure, the coordinates of the figure in the rendering area DIS, and the front/back sides of the figure. The vertex numbers of the figure are, for example, a set of numbers corresponding to the vertices of the figure, respectively. For example, when the figure is a triangle, the vertex numbers of the figure represent a set of numbers corresponding to the three vertices of the triangle, respectively.

Among the vertex information VINF and the "rendering command DCOM other than graphic information", the reading unit 321 receives coordinate information of figure VINFc from the CPU 201 and outputs the coordinate information VINFc and "rendering command DCOM other than graphic information" to the vertex processing unit 322. For example, the reading unit 321 reads the coordinate information VINFc from the ROM 202, the RAM 203, the disk 205, etc., in which the vertex information VINF written by the CPU 201 is stored, and outputs the read coordinate information VINFc to the vertex processing unit 322.

The vertex processing unit 322 performs coordinate-related vertex processing, such as rotating the figure, based on the coordinate information VINFc and rendering command DCOM other than the graphic information. The result of the vertex processing and the rendering command DCOM other than the graphic information are input to the figure creating unit 323.

The figure creating unit 323 converts the result of the vertex processing into graphic information, based on the result of the vertex processing by the vertex processing unit 322 and the "rendering command DCOM other than graphic information". For example, when the figure is a triangle, the figure creating unit 323 receives information of the triangle's three vertices as the result of the vertex processing and converts the result of the vertex processing into information of the triangle. In this manner, graphic information of the figure corresponding to the coordinate information VINFc is generated.

The figure removing unit 324 removes graphic information of a figure not rendered in the rendering area DIS from the graphic information made by the figure creating unit 323. For example, the figure removing unit 324 executes a clipping process and a culling process to remove graphic information of a figure not rendered in the rendering area DIS. For example, by executing the clipping process, the figure removing unit 324 removes a figure that is out of the display area. By executing the culling process, the figure removing unit 324 determines whether the figure depicts a front side or back side and removes the figure depicting the back side. When setting is made to display the back side of a figure, for example, the figure removing unit 324 adds to the graphic information, front-side/back-side information, such as a flag indicating the figure depicts the back side. The figure removing unit 324 outputs graphic information GINFc of a figure rendered in the rendering area DIS and the "rendering command DCOM other than graphic information", to the figure rendering area determining unit 325. The graphic information GINFc includes, for example, the vertex numbers of the figure, position information indicating the coordinates of the figure in the rendering area DIS, and front-side/back-side information of the figure.

The figure rendering area determining unit 325 calculates an area for rendering a figure in the rendering area DIS, based on the received graphic information GINFc from the figure removing unit 324. For example, the figure rendering area determining unit 325 calculates the minimum X coordinates, the minimum Y coordinates, the maximum X coordinates, and the maximum Y coordinates, from the graphic information GINFc. The figure rendering area determining unit 325 then determines that the area for rendering the figure is a rectangular area with a vertex defined as (minimum X coordinates, minimum Y coordinates) and a vertex defined as (maximum X coordinates, maximum Y coordinates). The figure rendering area determining unit 325 outputs the graphic information GINFc and the "rendering command DCOM other than graphic information" to the writing unit 326 and to the graphic information division area selecting unit 302.

The graphic information division area selecting unit 302 selects a division area DAR used as a rendering destination for a figure, based on the graphic information GINFc. The graphic information division area selecting unit 302 may select the division area DAR used as the rendering destination for the figure, based on the graphic information GINFc and on the "rendering command DCOM other than graphic information". The graphic information division area selecting unit 302 outputs the range of the division area DAR to the writing unit 326.

If all of the graphic information GINFc and all of the "rendering commands DCOM other than graphic information" cannot be stored in the graphic information buffer 311, the graphic information division area selecting unit 302 issues interrupt notification or a request for reading the "rendering command DCOM other than graphic information", to the CPU 201. The graphic information division area selecting unit 302 issues the interrupt notification or the reading request after receiving readout completion notification from the vertex reading unit 331. The reason for issuing the notice or request at this timing is that if the issuance is after the reception of the readout completion notification, available capacity is present in the graphic information buffers 311 and 312.

The writing unit 326 writes to the graphic information buffer 311, graphic information of a figure rendered in the division area DAR selected by the graphic information division area selecting unit 302 and the "rendering command DCOM other than graphic information". For example, the writing unit 326 removes from the graphic information GINFc, the graphic information GINFc of a figure that is not rendered in the division area DAR output from the graphic information division area selecting unit 302. The writing unit 326 then writes the unremoved graphic information GINFc and the "rendering command DCOM other than graphic information", to the graphic information buffer 311.

The graphic information sorting unit 303 sorts the graphic information GINFc stored in the graphic information buffer 311 and stores the sorted graphic information GINFc in the graphic information buffers 312.

The generating unit 304 executes a rendering process. For example, the generating unit 304 generates image data GDATA for the division area DAR, based on the graphic information GINFc and the "rendering command DCOM other than graphic information" stored in the graphic information buffers 312. The image data GDATA includes, for example, information of the colors of pixels, etc. The generating unit 304 may execute both the graphic process and the rendering process.

For example, when the coordinate converting unit 301 receives coordinate information of figure VINFc among the vertex information VINF, the generating unit 304 acquires the vertex information VINF corresponding to vertex numbers included in the graphic information GINF stored in the graphic information buffers 312. The generating unit 304 then executes the graphic process and the rendering process, using the acquired vertex information VINF, and generates the image data GDATA for the division area DAR.

The line buffer 313 stores therein the image data GDATA generated by the generating unit 304. For example, the line buffer 313 stores therein the image data GDATA for one division area DAR among division areas DAR making up the rendering area DIS. For this reason, the rendering apparatus 101 of this embodiment can make the memory size of the line buffer 313 smaller than the memory size of a frame buffer that stores image data composed of all of the pixels of the rendering area DIS.

The line depth buffer 314 stores therein the depths of pixels. For example, when the generating unit 304 generates the image data GDATA, the generating unit 304 refers to setting information and Z values, etc. stored in the depth buffer 314. The setting information includes, for example, a transformation matrix of a figure, material information, such as a reflection factor, and position information of a light source. The display circuit 305 sequentially reads image data GDATA from the line buffer 313 and displays an image in the rendering area DIS.

The vertex reading unit 331 acquires the graphic information GINFc and the "rendering command DCOM other than graphic information", from the graphic information buffer 312. The vertex reading unit 331 then reads vertex information VINFa corresponding to vertex numbers included in the graphic information GINF, from the ROM 202, the RAM 203, the disk 205, etc., where the vertex information VINFa is stored. The vertex information VINFa read by the vertex reading unit 331 includes, for example, coordinate information indicative of the three-dimensional coordinates of the vertices of a figure, information of the colors of the vertices, information of texture coordinates, and information of normal vectors. The vertex reading unit 331 outputs the read vertex information VINFa and the acquired "rendering command DCOM other than graphic information", to the vertex processing unit 332.

The vertex processing unit 332 executes the vertex processing based on the vertex information VINFa and the "rendering command DCOM other than graphic information". The vertex processing executed by the vertex processing unit 332 includes, for example, a coordinates-related process, such as rotating the figure, writing, calculation of the colors of vertices, calculation of texture coordinates, and calculation of a normal vector at each vertex. The result of the vertex processing and the "rendering command DCOM other than graphic information" are input to the figure creating unit 333.

The figure creating unit 333 converts the result of the vertex processing into graphic information, based on the result of the vertex processing by the vertex processing unit 332 and the "rendering command DCOM other than graphic information". For example, when the figure is a triangle, the figure creating unit 333 receives information of the three vertices of the triangle as the result of the vertex processing and converts the result of the vertex processing into information of the triangle. The figure creating unit 333 outputs the graphic information and the "rendering command DCOM other than graphic information", to the pixel generating unit 334. The graphic information output from the figure creating unit 333 includes, for example, position information of figure indicative of the coordinates of the figure in the rendering area DIS, information of an equation for the sides of the figure, information of colors, information of texture coordinate information of normal vectors, and information of the Z direction.

The pixel generating unit 334 generates pixel information based on the received graphic information and "rendering command DCOM other than graphic information" sent from the figure creating unit 333. The pixel generating unit 334 then outputs the pixel information to the pixel processing unit 335.

The pixel processing unit 335 performs calculation of colors and texture coordinates, etc., pixel by pixel, based on the received pixel information from the pixel generating unit 334. When generating pixel information of the division area DAR, the pixel generating unit 334, pixel processing unit 335, etc. refer to setting information, etc. for the division area DAR. The setting information is set by the "rendering command DCOM other than graphic information". The setting information includes, for example, a transformation matrix of the figure, material information, such as a reflection factor, and position information of a light source.

The pixel removing unit 336 removes pixel information not used for rendering in the rendering area DIS, from the pixel information processed by the pixel processing unit 335. For example, the pixel removing unit 336 conducts a Z test based on a Z value stored in the line depth buffer 314 and removes pixel information not used for rendering. The remaining pixel information corresponds to the image data GDATA for the division area DAR in which a figure to be rendered is rendered. The pixel removing unit 336 stores the image data GDATA for the division area DAR in the line buffer 313.

Figure 4:
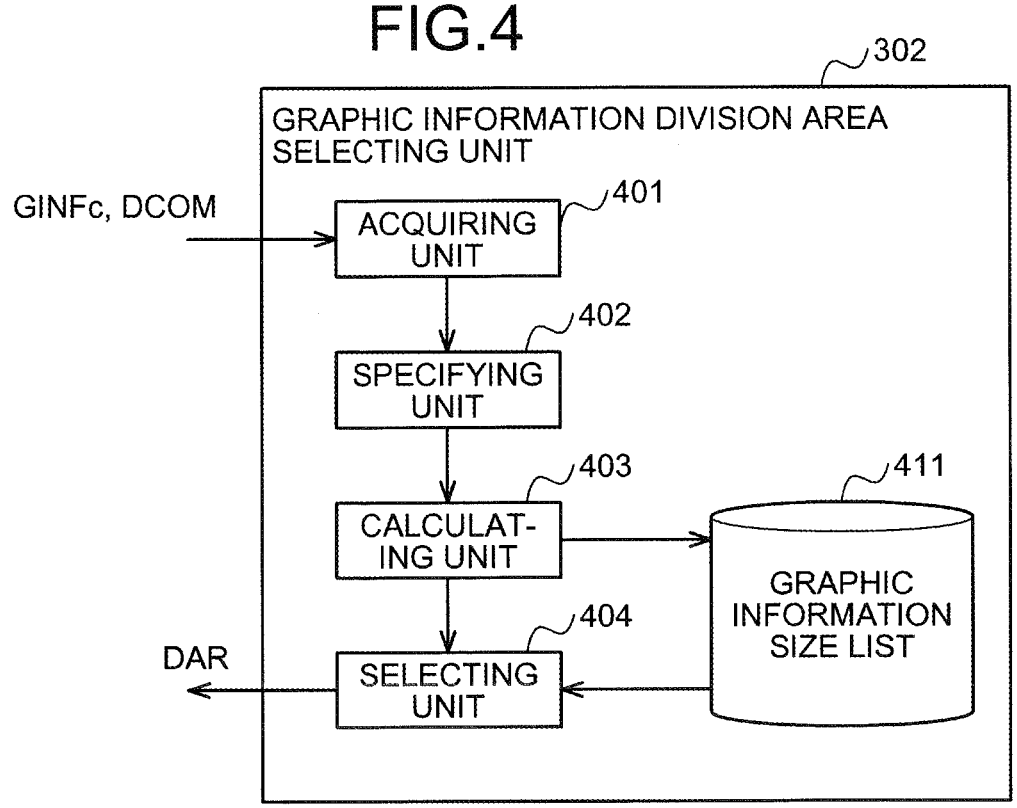
FIG. 4 is a block diagram of a graphic information division area selecting unit.

FIG. 4 is a block diagram of the graphic information division area selecting unit. The graphic information division area selecting unit 302 includes an acquiring unit 401, a specifying unit 402, a calculating unit 403, and a selecting unit 404. The rendering apparatus 101 can access the graphic information size list 411. The graphic information size list 411 is formed of a register, etc. of the rendering apparatus 101.

The acquiring unit 401 acquires graphic information GINF that includes the coordinates positions of vertices of a figure rendered in the rendering area DIS. The acquiring unit 401 may acquire the command DCOM that affects the figure rendered in the rendering area DIS. The acquired graphic information GINF and the command DCOM are stored in a register, etc. of the rendering apparatus 101.

The specifying unit 402 specifies based on the graphic information GINF acquired by the acquiring unit 401, graphic information GINF of a partial figure or the entire figure rendered in each division area DAR, for each of a group of division areas DAR created by dividing the rendering area. Identification information, etc., of the graphic information GINF specified for each division area DAR is stored in a register, etc. of the rendering apparatus 101.

The calculating unit 403 calculates based on the data size of the graphic information GINF, the total data size of the graphic information GINF of a partial figure or the entire figure to be rendered in each division area, the graphic information GINF being specified by the specifying unit 402, for each division area. For example, the calculating unit 403 may calculate the total data size of the graphic information GINF by simply totaling data sizes or by adding up data sizes based on an alignment condition met by the graphic information GINF. For example, a case is assumed where the graphic information GINF is variable in data length and is stored in the register of the rendering apparatus 101 according to 4-byte alignment. In this case, when graphic information GINF_1 for rendering in a certain division area DAR is 3 [bytes] and graphic information GINF_2 for rendering in the same is 4 [bytes], the calculating unit 403 calculates the total data size of the graphic information GINF at 4*2=8 [bytes].

The calculating unit 403 may calculate the total data size of a command, based on the command DCOM acquired by the acquiring unit 401. The result of the calculation is stored in the graphic information size list 411.

The selecting unit 404 selects from among f a group of division areas DAR, a division area DAR to be used as a rendering destination for the figure to be rendered. The selecting unit 404 makes the selection based on the following information. The information includes the data capacity of the graphic information buffer 311 included in the graphic information acquired by the acquiring unit 401 and the total data size of the graphic information calculated by the calculating unit 403 for each division area DAR. In a specific example of selection of the division area DAR, for example, when the division areas DAR_1 to DAR_4 are present, if graphic information GINF for rendering in the division area DAR_1 does not exceed the data capacity of the graphic information buffer 311, the selecting unit 404 selects the division area DAR_1. In this manner, the selecting unit 404 may select the division areas DAR_1, DAR_2, . . . in ascending order or may select the division areas DAR_4, DAR_3, . . . in descending order.

The selecting unit 404 may select from among the group of division areas DAR, the division area DAR used as the rendering destination for the figure to be rendered, based on the data capacity of the graphic information buffer 311, the total data size of the graphic information GINF, and the total data size of the command DCOM.

Based on the following information, the selecting unit 404 may select a division area DAR to be used as a new rendering destination for the figure to be rendered, among division areas DAR that remain after excluding the division area DAR used as the rendering destination and a division area DAR included therein from the group of division areas DAR. The information includes the data capacity of the graphic information buffer 311 and the total data size calculated by the calculating unit 403 for each division area. The result of the selection is stored in the register, etc. of the rendering apparatus 101.

The writing unit 326 of FIG. 3 writes graphic information GINF of a figure to be rendered in a rendering destination division area DAR selected by the selecting unit 404, to the graphic information buffer 311. The writing unit 326 may write to the graphic information buffer 311, the command DCOM and the graphic information of the figure to be rendered in the rendering destination division area selected by the selecting unit 404. After the generating unit 304 generates an image for the rendering destination division area, the writing unit 326 may write to the geometry figure buffer 311, graphic information of a figure that is to be rendered in a division area used as a new rendering destination selected by the selecting unit 404.

The generating unit 304 of FIG. 3 generates an image for the division area DAR used as the rendering destination, based on the graphic information GINF written to the graphic information buffer 311 by the writing unit 326. The generating unit 304 may generate an image for a division area DAR to be used as a new rendering destination, based on the graphic information GINF written to the graphic information buffer 311 by the writing unit 326.

Figure 5:
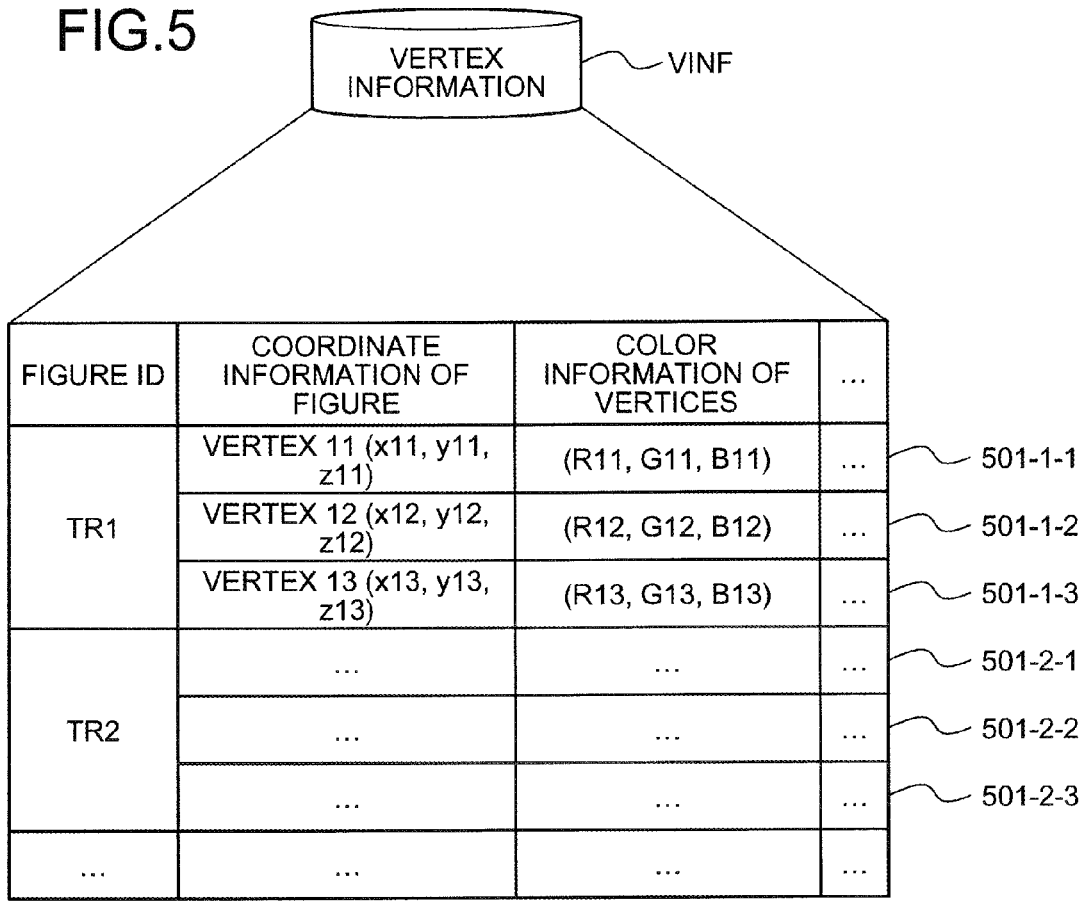
FIG. 5 is an explanatory diagram of an example of the contents of vertex information.

FIG. 5 is an explanatory diagram of an example of the contents of the vertex information. The vertex information VINF includes for each figure, coordinate information of the figure and information of colors of vertices. The vertex information VINF may include information of texture coordinates and information of normal vectors. For example, the vertex information VINF of FIG. 5 has records 501-1-1 to 501-2-3, which indicate coordinate information and color information of the vertices 11, 12, and 13 of the triangle TR1.

The vertex information VINF is stored in, for example, the ROM 202, the RAM 203, and the disk 205. The coordinate information included in the vertex information VINF, for example, may be information of two-dimensional coordinates.

Figure 6:
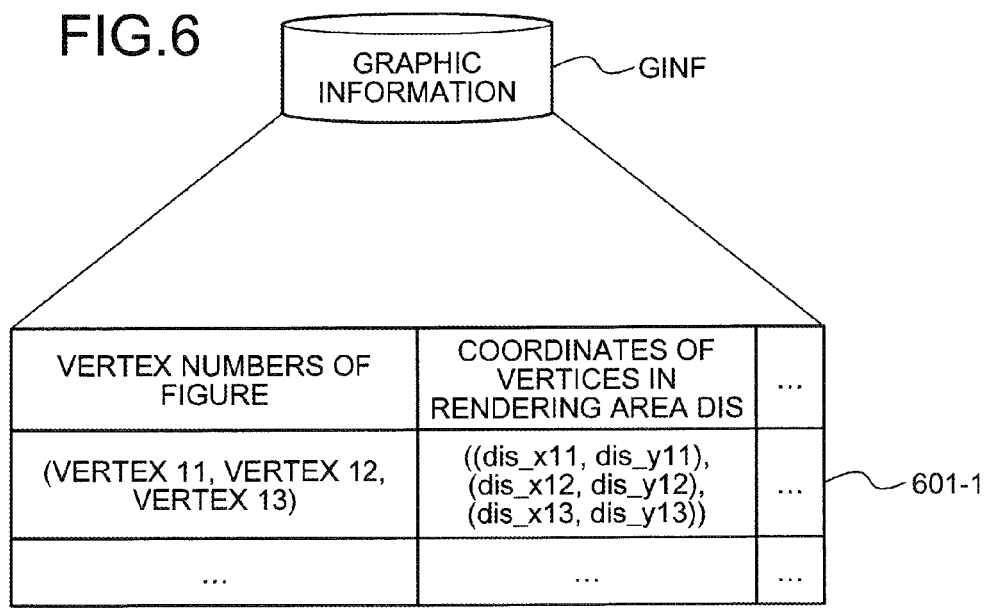
FIG. 6 is an explanatory diagram of an example of the contents of graphic information according to the first embodiment.

FIG. 6 is an explanatory diagram of an example of the contents of the graphic information according to the first embodiment. The graphic information GINF includes information of the vertex numbers and the vertex coordinates of a figure in the rendering area DIS. The graphic information GINF may include information of an equation for the sides of a figure, information of colors, information of texture coordinate information of normal vectors, information of the Z direction, and information of the front-side/back-side of a figure.

For example, the equation for the sides of the figure is an equation expressing three sides when the figure is a triangle. The information of the Z direction is information of the depth of the figure. The information of colors, texture coordinates, and normal vectors included in the graphic information GINF each have a value variation corresponding to an increment in the X direction, a value variation corresponding to an increment in the Y direction, and an offset value. For example, the information of colors included in the graphic information GINF has a color variation corresponding to an increment in the X direction, a color variation corresponding to an increment in the Y direction, and an offset value.

For example, the graphic information GINF depicted in FIG. 6 has a record 601-1, which indicates the vertex numbers of the triangle TR1 as the vertices 11, 12, and 13 and the coordinates of the vertices 11, 12, and 13 in the rendering area DIS.

FIG. 7 is an explanatory diagram of an example of the contents of the graphic information size list. The graphic information size list 411 has three items including "data size of graphic information", "data size of rendering command other than graphic information", and "total data size".

The item "data size of graphic information" has sub-items in which the positions of division areas and the data sizes of graphic information for rendering in division areas are entered. The item "data size of graphic information" of FIG. 7 has records 701-1 to 701-8. In the sub-item "position of division area", information uniquely identifying a specific division area is stored. In the first embodiment, the rendering area DIS is divided along the Y coordinates such that division areas do not overlap each other. As a result, each division area DAR may be identified uniquely with the value of Y coordinates. In the following explanation, a division area DAR of Y=0 to 59 [pixels] is defined as the DAR_1. In the same manner, a division area DAR of Y=60 to 119 [pixels] is defined as the DAR_2, and a division area DAR of Y=420 to 479 [pixels] is defined as a DAR_8. In the sub-item "data size of graphic information to be rendered in division area", the total data size of graphic information GINF for rendering in a rendering destination division area DAR is stored.

In the item "data size of rendering command other than graphic information", the data size of the "rendering command DCOM other than graphic information" is stored. The "rendering command DCOM other than graphic information" is, for example, a command to rotate a figure or a command to paste an image to a figure. The item "data size of rendering command other than graphic information" depicted in FIG. 7 has a record 702.

In the item "total data size", the grand total of the total of data sizes of graphic information for rendering in division areas and the data size of the "rendering command DCOM other than graphic information" is stored. The item "total data size" depicted in FIG. 7 has a record 703.

An example of updating the graphic information size list 411 when the vertex information VINF or the "rendering command DCOM other than graphic information" is received will be described with reference to FIGS. 8 to 11.

FIG. 8 is an explanatory diagram of an example of updating the graphic information size list according to the first embodiment. The graphic information size list 411 of FIG. 8 indicates a state where the rendering apparatus 101 acquires graphic information GINF having minimum Y coordinates of 32 [pixels] and maximum Y coordinates of 150 [pixels] that make the data size of the graphic information GINF 32 [bytes] and updates the graphic information size list 411 with the acquired graphic information GINF. For example, the rendering apparatus 101 enters 32 [bytes] into three columns of the sub-item "data size of graphic information to be rendered in division area" corresponding to the following three division areas DAR in which a figure indicated by the acquired graphic information GINF is to be rendered. The three division areas DAR include the division area DAR_1 of Y=0 to 59 [pixels], the DAR_2 of Y=60 to 119 [pixels], and the DAR_3 of Y=120 to 179 [pixels]. The rendering apparatus 101 enters 96 [bytes] into the item "total data size", the entered 96 [bytes] being the sum of the data sizes of graphic information for rendering in the three division areas, i.e., 32+32+32=96 [bytes], and the data size of the "rendering command other than graphic information", i.e., 0 [byte]. A register for storing the sum of the data sizes of the graphic information for rendering in division areas may be provided.

Figure 9:
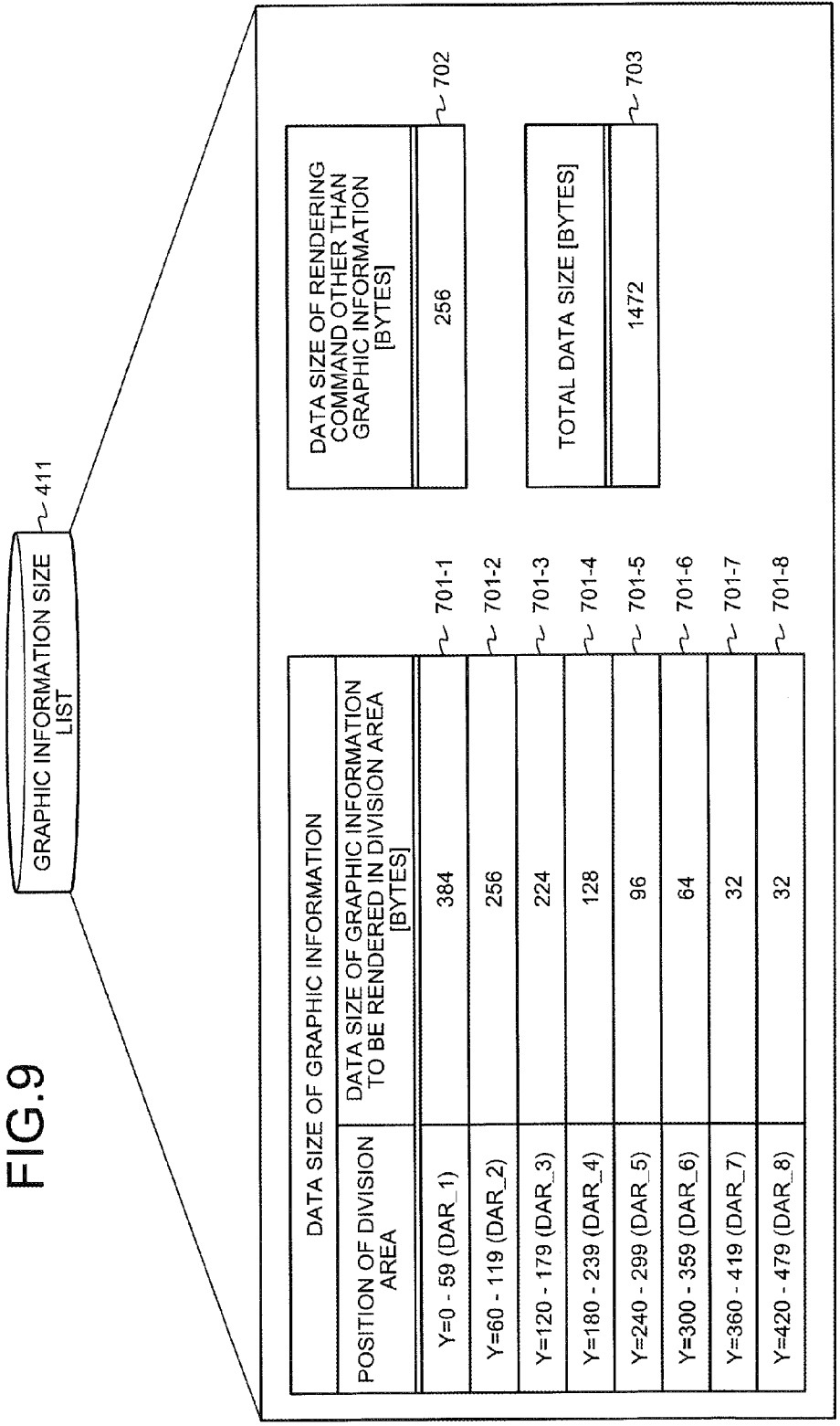
FIG. 9 is an explanatory diagram of an example of updating the graphic information size list of the first embodiment.

FIG. 9 is an explanatory diagram of an example of updating the graphic information size list of the first embodiment. The graphic information size list 411 of FIG. 9 indicates a state where the rendering apparatus 101 acquires all of the graphic information GINF and all of the rendering commands other than graphic information issued from the CPU 201 and updates the graphic information size list 411 with the acquired graphic information GINF and rendering commands. The rendering apparatus 101 compares the value in the item "total data size" with the memory capacity of the graphic information buffer 311 and determines whether all of the acquired graphic information GINF and rendering commands other than graphic information can be written to the graphic information buffer 311.

In the example of FIG. 9, the memory capacity of the graphic information buffer 311 allowing data writing thereto is 1024 [bytes] and the value in the item "total data size" is 1472 [bytes]. The rendering apparatus 101, therefore, cannot write all of the acquired graphic information GINF and rendering commands other than graphic information to the graphic information buffer 311, and determines that the writing data exceeds the capacity of the graphic information buffer 311. A process to be executed in the case of excess data will be described with reference to FIG. 10. If all of the acquired graphic information GINF and rendering commands other than graphic information can be written to the graphic information buffer 311 and therefore, when no data overflow occurs, the rendering apparatus 101 writes all of the acquired graphic information GINF and rendering commands other than graphic information to the graphic information buffer 311.

FIG. 10 is an explanatory diagram of an example of updating the graphic information size list according to the first embodiment. The rendering apparatus 101 selects a division area DAR in which a figure indicated by graphic information GINF having a data size smaller than 1024 [bytes] is to be rendered. Because rendering expected by the app cannot be performed if the "rendering command DCOM other than graphic information" is not executed, the rendering apparatus 101 first secures an area to which the "rendering command DCOM other than graphic information" is to be written.

For example, the rendering apparatus 101 subtracts the data size 256 [bytes] of the "rendering command DCOM other than graphic information" from the memory capacity 1024 [bytes] of the graphic information buffer 311. The resulting 768 [bytes] represents an area to which the graphic information GINF can be written. The rendering apparatus 101 then selects a division area DAR in which a figure indicated by the graphic information GINF that can be written to the area of 768 [bytes] is to be rendered. In the example of FIG. 10, the rendering apparatus 101 selects the division area DAR_1 and the division area DAR_2. Subsequently, the rendering apparatus 101 writes the graphic information GINF of figures to be rendered in the selected division areas DAR_1 and DAR_2, to the graphic information buffer 311.

The division areas DAR_3 and DAR_8 to which the graphic information GINF cannot be written will be described with reference to FIG. 11.

Figure 11:
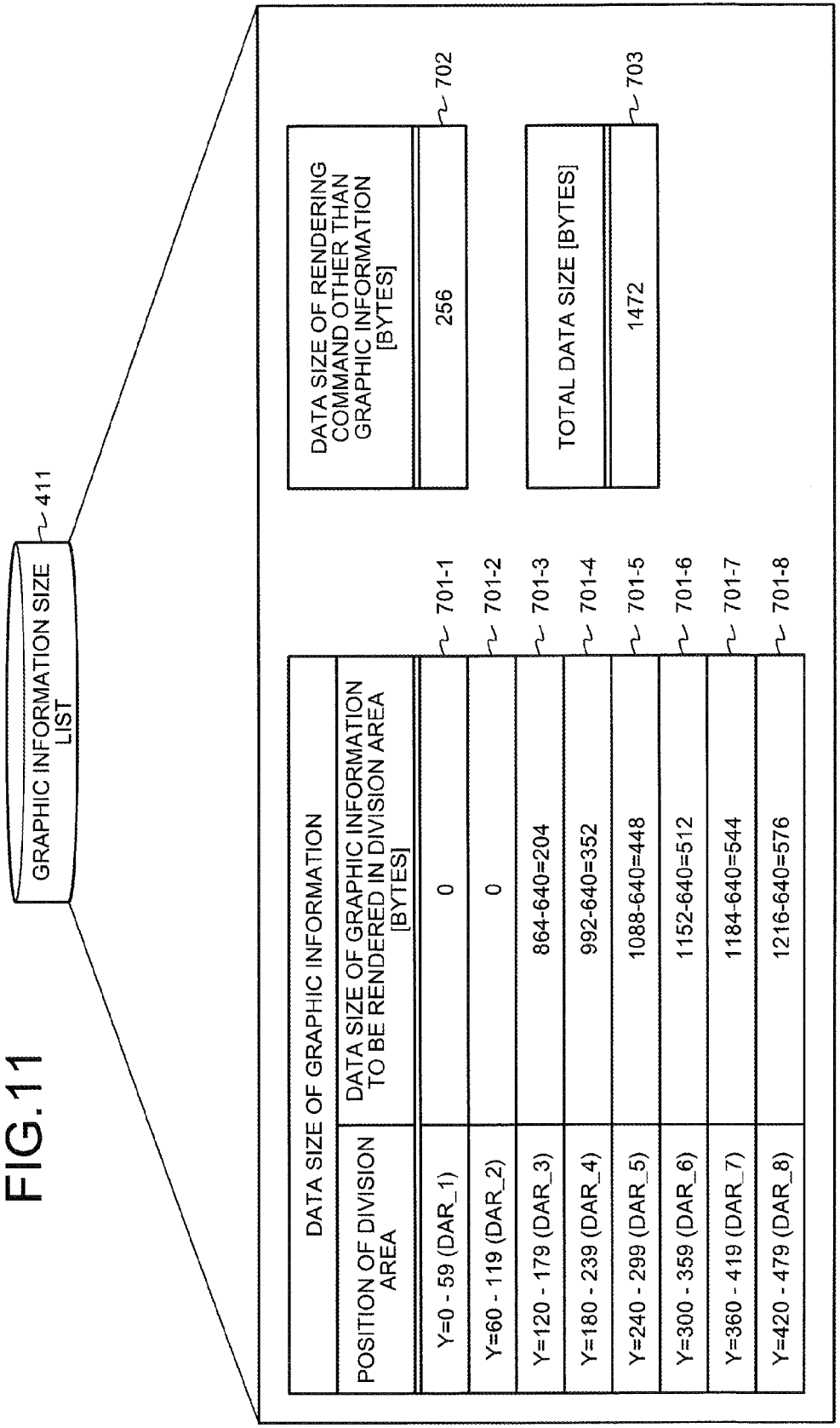
FIG. 11 an explanatory diagram of an example of updating the graphic information size list of the first embodiment.

FIG. 11 an explanatory diagram of an example of updating the graphic information size list of the first embodiment. The rendering apparatus 101 sets values in columns of the sub-item "data size of graphic information to be rendered in division area" corresponding to the division areas DAR_1 and DAR_2 to which the graphic information GINF has been successfully written, to zero, and subtracts the written data size from values in columns of the sub-item "data size of graphic information to be rendered in division area" corresponding to the division areas DAR_3 and DAR_8 to which the graphic information GINF cannot be written. For example, the rendering apparatus 101 sets values in the columns of the sub-item "data size of graphic information to be rendered in division area" in the records 701-1 and 701-2, to 0 [bytes], and subtracts 640 [bytes] from values in the columns of the sub-item "data size of graphic information to be rendered in division area" in the records 701-3 to 701-8.

The remaining data size of graphic information GINF is 576 [bytes], as indicated in the record 701-8, and the remaining memory capacity of the graphic information buffer 311 allowing data writing thereto is 768 [bytes], which is given by subtracting the data size of the "rendering command DCOM other than graphic information" from the original memory capacity. The rendering apparatus 101, therefore, reads out the graphic information GINF of the figures to be rendered in the division areas DAR_1 and DAR_2 defined with Y=0 to 119 and then writes graphic information GINF of figures to be rendered in the division areas DAR_3 to DAR_8 defined with Y=120 to 479, to the graphic information buffer 311. Flowcharts of a rendering process according to the first embodiment will be described with reference to FIGS. 12 to 14.

Figure 12:
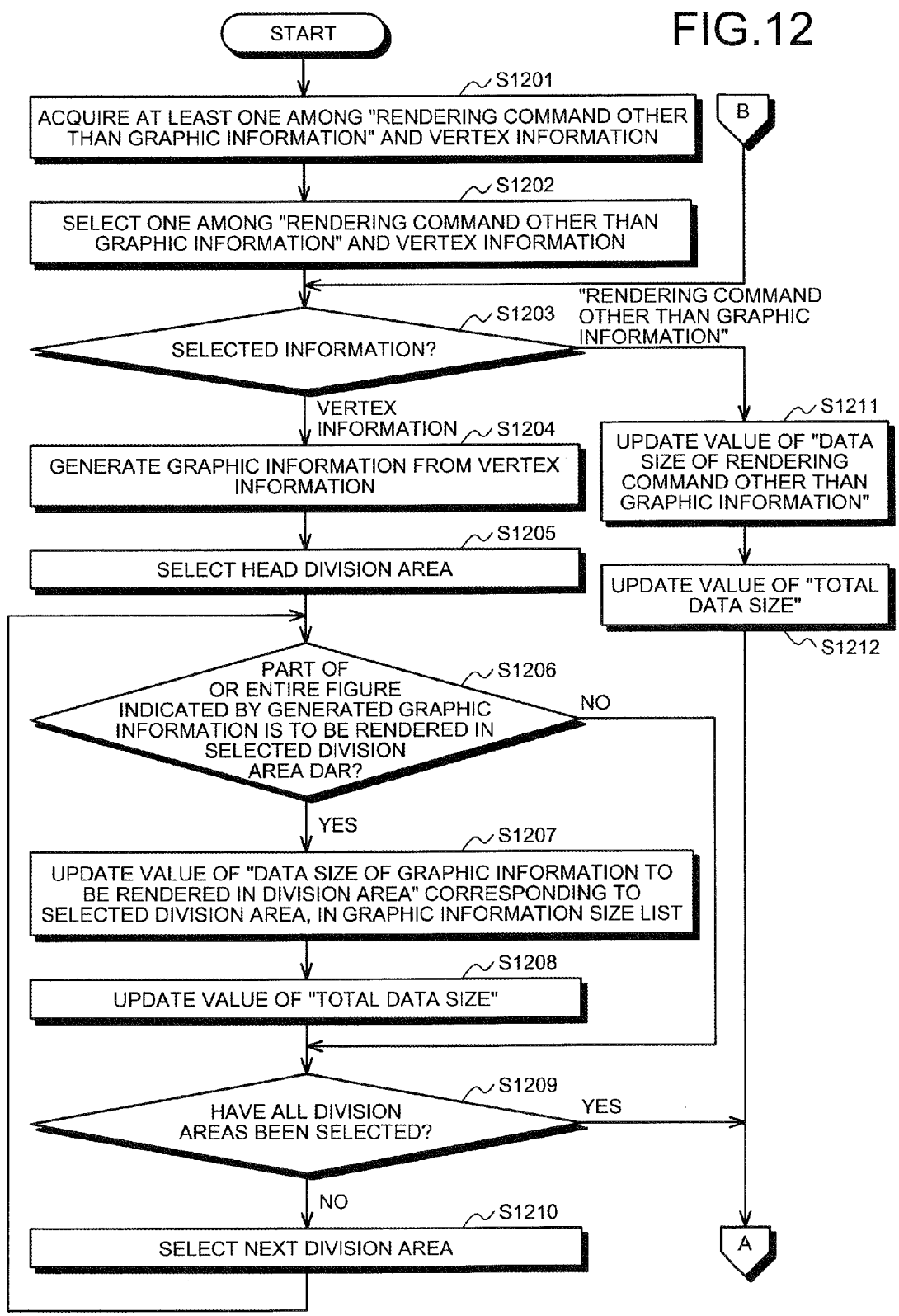
FIG. 12 is a flowchart of an example of a procedure of a rendering process according to the first embodiment.
Figure 13:
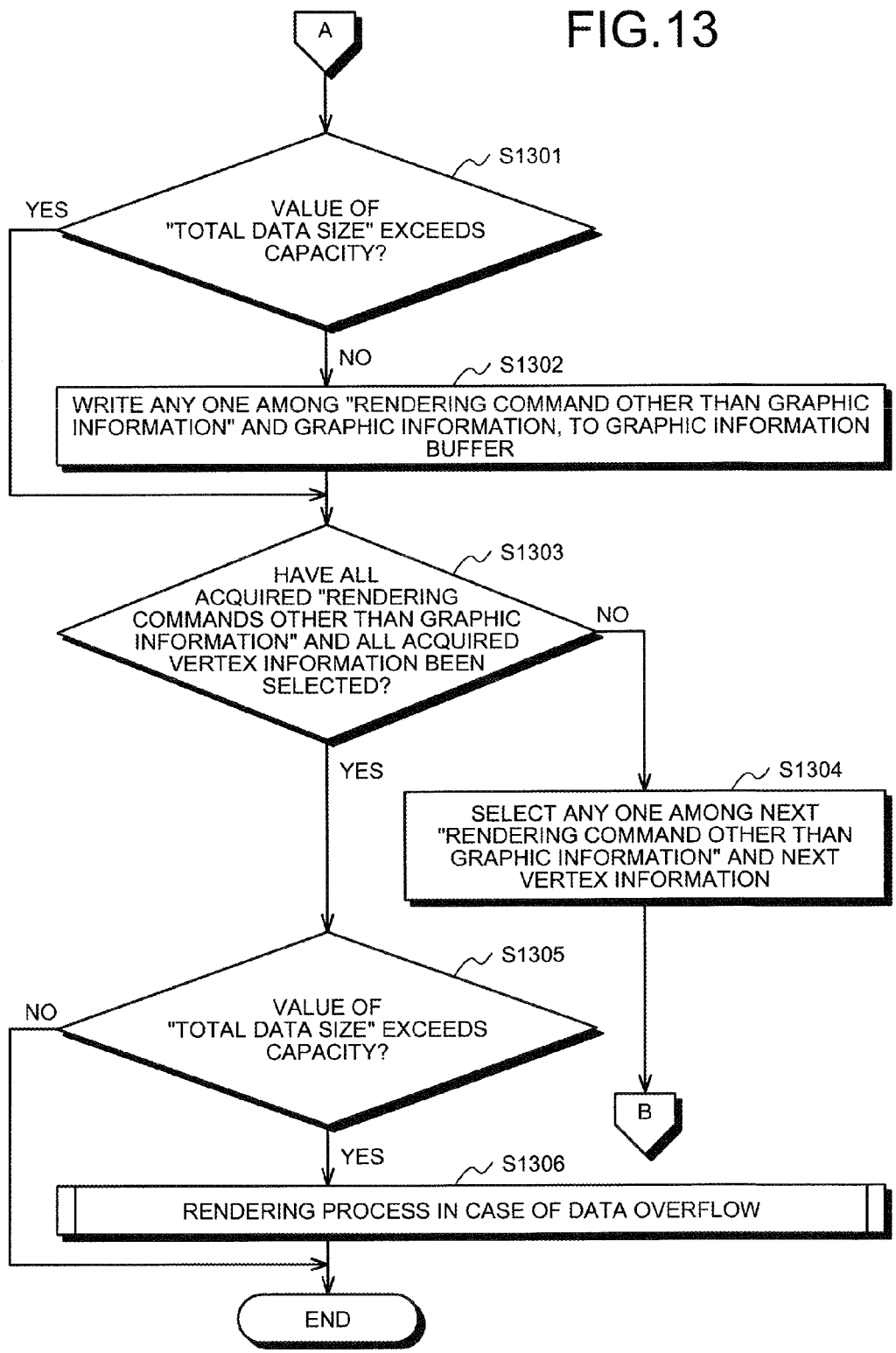
FIG. 13 is another flowchart of the example of the procedure of the rendering process according to the first embodiment.

FIG. 12 is a flowchart of an example of a procedure of the rendering process according to the first embodiment. FIG. 13 is another flowchart of the example of the procedure of the rendering process according to the first embodiment. The rendering process is a process of acquiring the vertex information VINF and the "rendering command DCOM other than graphic information" from the CPU 201 and generating an image.

The rendering apparatus 101 acquires at least any one among the "rendering command DCOM other than graphic information" and the vertex information VINF (step S1201). The rendering apparatus 101 then selects one among the "rendering command DCOM other than graphic information" and the vertex information VINF (step S1202). After finishing step S1304 of FIG. 13 or step S1202, the rendering apparatus 101 checks the selected information (step S1203).

If the selected information is the vertex information VINF (step S1203: vertex information), the rendering apparatus 101 generates graphic information GINF from the vertex information VINF (step S1204). Subsequently, the rendering apparatus 101 selects the head division area DAR (step S1205). The rendering apparatus 101 then determines if a part of or the entire figure indicated by the generated graphic information GINF is to be rendered in the selected division area DAR (step S1206). If a part of or the entire figure indicated by the generated graphic information GINF is to be rendered in the selected division area DAR (step S1206: YES), the rendering apparatus 101 updates the value in a column of the sub-item "data size of graphic information to be rendered in division area" corresponding to the selected division area, in the graphic information size list 411 (step S1207). The rendering apparatus 101 then updates the value in the item "total data size" (step S1208).

After finishing step S1208 or if the figure indicated by the generated graphic information GINF is not to be rendered in the selected division area DAR (step S1206: NO), the rendering apparatus 101 determines whether all division areas DAR have been selected (step S1209). If an unselected division area DAR is present (step S1209: NO), the rendering apparatus 101 selects the next division area DAR (step S1210). After finishing step S1210, the rendering apparatus 101 proceeds to step S1206.

If the "rendering command DCOM other than graphic information" has been selected (step S1203: "rendering command other than graphic information"), the rendering apparatus 101 updates the value in the item "data size of rendering command other than graphic information" (step S1211). The rendering apparatus 101 then updates the value in the item "total data size" (step S1212).

After finishing step S1212 or when having selected all division areas DAR (step S1209: YES), the rendering apparatus 101 proceeds to step S1301 of FIG. 13.

After finishing step S1212 or when YES results at step S1209, the rendering apparatus 101 determines whether the value in the item "total data size" exceeds the capacity (step S1301). If the value in the item "total data size" does not exceed the capacity (step S1301: NO), the rendering apparatus 101 writes any one among the "rendering command DCOM other than graphic information" and the graphic information GINF, to the graphic information buffer 311 (step S1302).

After finishing step S1302 or if the value in the item "total data size" exceeds the available capacity (step S1301: YES), the rendering apparatus 101 determines whether all acquired "rendering commands DCOM other than graphic information" and all acquired vertex information VINF have been selected (step S1303). If an unselected "rendering command DCOM other than graphic information" or unselected vertex information VINF is present (step S1303: NO), the rendering apparatus 101 selects any one among the next "rendering command DCOM other than graphic information" and next vertex information VINF (step S1304). After finishing step S1304, the rendering apparatus 101 proceeds to step S1203.

When having selected all "rendering commands DCOM other than graphic information" and all of the vertex information VINF (step S1303: YES), the rendering apparatus 101 determines whether the value in the item "total data size" exceeds the capacity (step S1305). If the value in the item "total data size" exceeds the capacity (step S1305: YES), the rendering apparatus 101 executes a rendering process for the case of data overflow (step S1306). The details of the rendering process in the case of data overflow will be described later with reference to FIG. 14. After finishing step S1306, the rendering apparatus 101 ends the rendering process.

If the value in the item "total data size" does not exceed the capacity (step S1305: NO), it means that the rendering apparatus 101 has stored to the graphic information buffer 311, all of the "rendering commands DCOM other than graphic information" and the vertex information VINF that has been generated from all of the graphic information GINF. The rendering apparatus 101, therefore, ends the rendering process. By executing the rendering process, the rendering apparatus 101 is able store to the graphic information buffer 311, all of the acquired "rendering commands DCOM other than graphic information" and the graphic information GINF generated from all of the vertex information VINF.

Figure 14:
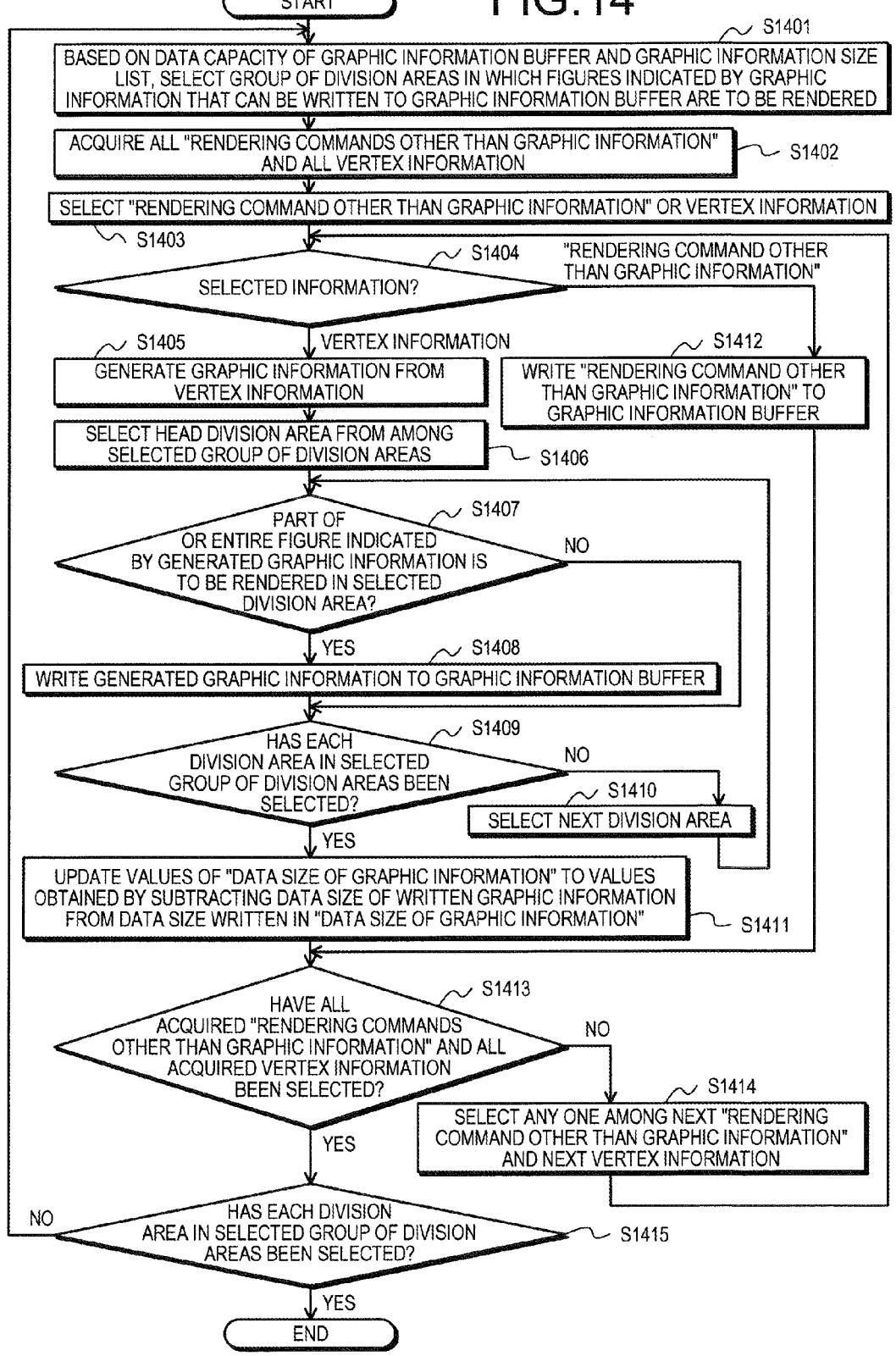
FIG. 14 is a flowchart of an example of a procedure of the rendering process in a case of data overflow according to the first embodiment.

FIG. 14 is a flowchart of an example of a procedure of the rendering process in the case of data overflow according to the first embodiment. The rendering process in the case of data overflow is a rendering process that is executed when the total data size of all of the acquired "rendering commands DCOM other than graphic information" and all of vertex information VINF exceeds the data capacity of the graphic information buffer 311.

The rendering apparatus 101 selects a group of division areas DAR in which figures indicated by graphic information GINF that can be written to the graphic information buffer 311 are to be rendered, based on the data capacity of the graphic information buffer 311 and the graphic information size list 411 (step S1401). The rendering apparatus 101 then acquires all of the "rendering commands DCOM other than graphic information" and all of vertex information VINF (step S1402). Subsequently, the rendering apparatus 101 selects the "rendering command DCOM other than graphic information" or the vertex information VINF (step S1403).

After finishing step S1403 or step S1414, the rendering apparatus 101 checks the selected information (step S1404). When having selected the vertex information VINF (step S1404: vertex information), the rendering apparatus 101 generates graphic information GINF from the vertex information VINF (step S1405). The rendering apparatus 101 then selects the head division area DAR from among the selected group of division areas DAR (step S1406). The rendering apparatus 101 then determines if a part of or the entire figure indicated by the generated graphic information GINF is to be rendered in the selected division area DAR (step S1407). If a part of or the entire the figure indicated by the generated graphic information GINF is to be rendered in the selected division area DAR (step S1407: YES), the rendering apparatus 101 writes the generated graphic information GINF to the graphic information buffer 311 (step S1408).

After finishing step S1408 or if the figure indicated by the generated graphic information GINF is not to be rendered in the selected division area DAR (step S1407: NO), the rendering apparatus 101 determines whether each of the division areas DAR in the selected group of division areas DAR has been selected (step S1409). If an unselected division area DAR is present (step S1409: NO), the rendering apparatus 101 selects the next division area DAR (step S1410). After finishing step S1410, the rendering apparatus 101 proceeds to step S1407.

When having selected all of the selected group of division areas DAR (step S1409: YES), the rendering apparatus 101 updates the values in the item "data size of graphic information" to values obtained by subtracting the data size of written graphic information from data size written in the item "data size of graphic information" (step S1411). This operation executed at step S1411 is equivalent to the operation indicated in FIG. 11.

If the selected information is the "rendering command DCOM other than graphic information" (step S1404: "rendering command other than graphic information"), the rendering apparatus 101 writes the "rendering command DCOM other than graphic information" to the graphic information buffer 311 (step S1412).

After finishing step S1411 or step S1412, the rendering apparatus 101 determines whether all of the acquired "rendering commands DCOM other than graphic information" and all of the acquired vertex information VINF has been selected (step S1413). If any one of the "rendering commands DCOM other than graphic information" or vertex information VINF has not been selected yet (step S1413: NO), the rendering apparatus 101 selects the next "rendering command DCOM other than graphic information" or the next vertex information VINF (step S1414). After finishing step S1414, the rendering apparatus 101 proceeds to step S1404.

When having selected all of the "rendering commands DCOM other than graphic information" and all of vertex information VINF (step S1413: YES), the rendering apparatus 101 then determines whether each of the division areas DAR in the selected group of division areas DAR has been selected (step S1415). When an unselected division area DAR is present among the selected group of division areas DAR (step S1415: NO), the rendering apparatus 101 proceeds to step S1401. When having selected all of the selected group of division areas DAR (step S1415: YES), the rendering apparatus 101 ends the rendering process in the case of data overflow. By executing the rendering process in the case of data overflow, the rendering apparatus 101 can write all of the "rendering commands DCOM other than graphic information" and all of vertex information VINF to the graphic information buffer 311 even if data overflow occurs.

As described above, the rendering apparatus 101 of the first embodiment specifies a figure to be rendered in each of division areas DAR created by dividing the rendering area DIS. Based on the data volume of graphic information GINF of the figure, the rendering apparatus 101 then writes to the buffer 102, graphic information for rendering in a selected division area DAR such that the graphic information does not exceed the capacity of the buffer 102. Through this process, the rendering apparatus 101 enables the memory capacity of the buffer 102 to be reduced while properly rendering a figure as requested by the app. For example, a case is assumed where graphic information GINF for rendering in the upper half of the rendering area DIS is fixed. In this case, the rendering apparatus 101 writes graphic information GINF to the buffer for each of division areas DAR created by subdividing the upper half of the rendering area DIS, and writes graphic information GINF to the buffer for one division area DAR making up the lower half of the rendering area DIS. In this manner, even if an area in which a figure indicated by the graphic information GINF is to be rendered is fixed, the possibility of proper rendering can be improved.

For example, the capacity of the entire memory included in the rendering apparatus 101 can suppressed to approximately 256 [kilobytes]. For example, a developer of the rendering apparatus 101 sets the memory capacity of each of the graphic information buffers 311 and 312 to 96 [kilobytes] and the memory capacity of each of the line buffer 313 and the line depth buffer 314 to 30 [kilobytes].

Configuration may be such that the rendering apparatus 101 calculates the total data size of the "rendering command DCOM other than graphic information" and based on the data volume of the "rendering command DCOM other than graphic information" and graphic information GINF of a figure, selects a division area DAR that prevents the rendering command DCOM and graphic information GINF from exceeding the graphic information buffer 311. This allows the rendering apparatus 101 to write the "rendering command DCOM other than graphic information" preferentially to the graphic information buffer 311 and thereby, to perform rendering expected by the app and enable the memory capacity of the graphic information buffer 311 to be reduced.

The rendering apparatus 101 may select a division area to be used as a new rendering destination from among the division areas that remain after excluding the selected divide area DAR and a division area DAR included in the selected divide area DAR from the rendering area DIS. In this case, even if writing graphic information GINF exceeds the capacity of the graphic information buffer 311, the rendering apparatus 101 first writes part of the graphic information GINF to the graphic information buffer 311 to generate an image for the selected division area DAR and then writes the rest of graphic information GINF to the graphic information buffer 311, whereby the possibility of proper rendering can be improved.

The rendering apparatus 101 of the first embodiment divides the rendering area DIS such that division areas do not overlap each other. In this case, if graphic information GFIN of a figure to be rendered across multiple division areas DAR is present, the graphic information GFIN is copied for each division area DAR, which results in storage of redundant information in the graphic information buffer 311. The rendering apparatus 101 according to a second embodiment divides the rendering area DIS such that one division area DAR is included in a different division area DAR. As a result, even if graphic information GFIN used across multiple division areas DAR is present, copying of the graphic information GFIN of a figure to be rendered in each division area DAR is suppressed, and less redundant information is stored in the graphic information buffer 311. The rendering apparatus 101 of the second embodiment will hereinafter be described with reference to FIGS. 15 to 21. Components identical to those described in the first embodiment are denoted by the same reference numerals used in the first embodiment and description thereof is omitted.

The functions of the specifying unit 402 and the selecting unit 404 of the graphic information division area selecting unit 302 described with reference to FIG. 4 are modified in the second embodiment. The modified part will be explained in the following description.

The specifying unit 402 of the second embodiment specifies graphic information GINF of a partial figure or the entire figure to be rendered in each division area, for each of division areas DAR making up a division area group including first and second division areas DAR, based on the following information. The information is graphic information GINF acquired by the acquiring unit 401. The first division area DAR is part of the rendering area DIS. The second division area DAR is a part of or the entire of the rendering area DIS, includes the first division area, and is therefore larger than the first division area.

When candidates for a division area used as a rendering destination are the first and second division areas, the selecting unit 404 of the second embodiment selects the second division area as the division area used as the figure rendering destination, based on the following information. The information includes the data capacity of the graphic information buffer 311, the total data size of graphic information calculated for the first division area by the calculating unit 403, and the total data size of graphic information calculated for the second division area by the calculating unit 403.

Figure 15:
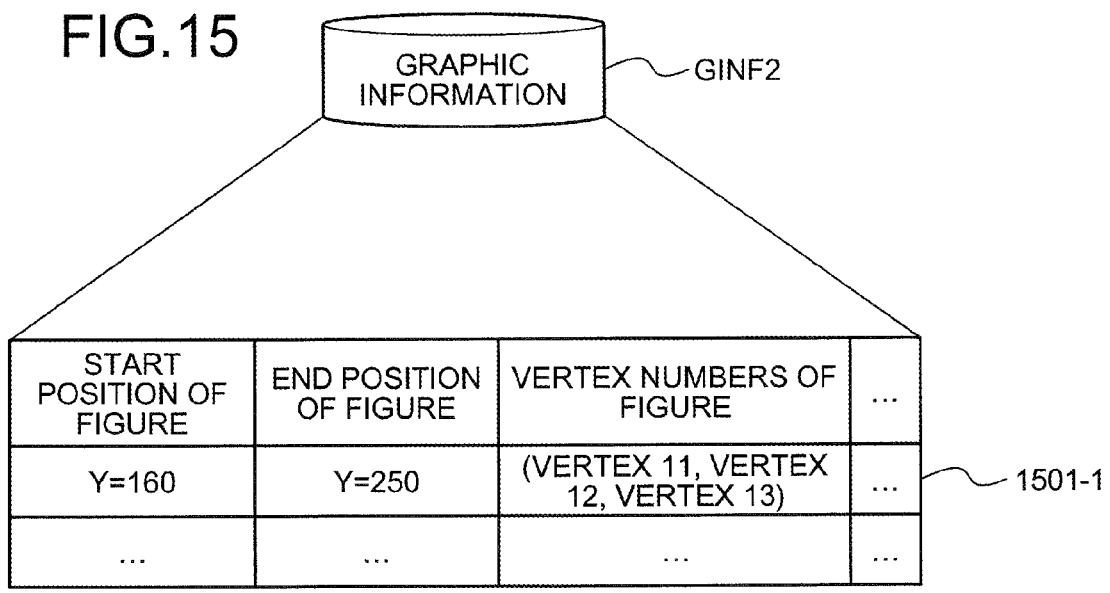
FIG. 15 is an explanatory diagram of an example of the contents of graphic information according to a second embodiment.

FIG. 15 is an explanatory diagram of an example of the contents of graphic information according to the second embodiment. Graphic information GINF2 of the second embodiment includes information of the start position of a figure, the end position of a figure, and vertex numbers of a figure. The graphic information GINF2 may include information of an equation for the sides of a figure, information of colors, information of texture coordinate information of normal vectors, information of the Z direction, and information of the front-side/back-side of a figure. Because the rendering area DIS is divided along the Y coordinates in the second embodiment, a Y coordinates value is entered in columns of the items of the start position of a figure and the end position of a figure. If the rendering area DIS is divided along the X coordinates, an X coordinates value is entered in columns of the items of the start position of a figure and the end position of a figure.

For example, the graphic information GINF2 of FIG. 15 has a record 1501-1. The record 1501-1 indicates that in the rendering area DIS, the start position in the Y direction is 160 [pixels], the end position in the Y direction is 250 [pixels], and the vertex numbers of the triangle TR1 are vertex 11, vertex 12, and vertex 13.

An example of updating the graphic information size list 411 will be described using the graphic information GINF2 depicted in FIG. 15 and with reference to FIGS. 16 to 18.

Figure 16:
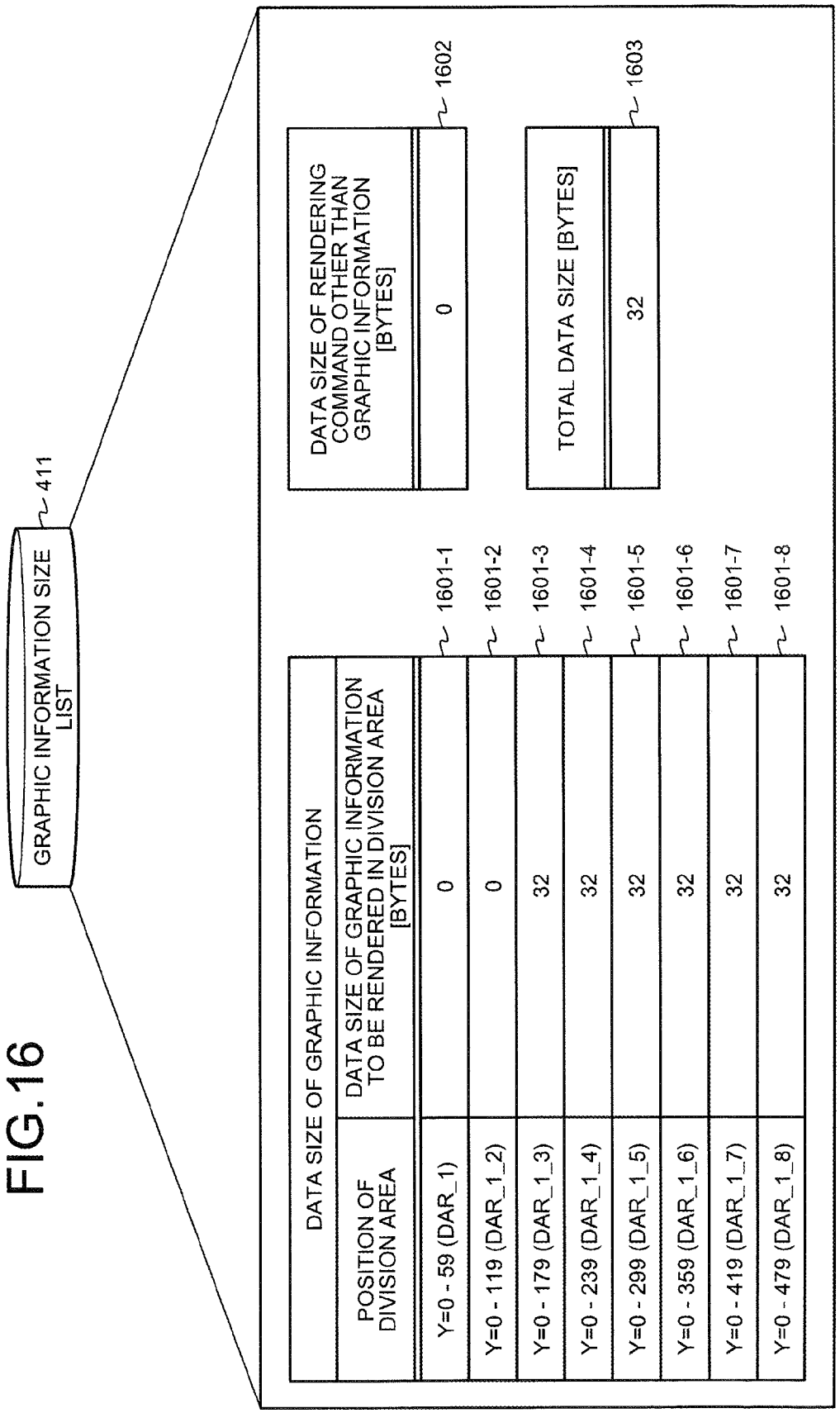
FIG. 16 is an explanatory diagram of an example of updating the graphic information size list according to the second embodiment.

FIG. 16 is an explanatory diagram of an example of updating the graphic information size list according to the second embodiment. In FIG. 16, the item "data size of graphic information" has records 1601-1 to 1601-8, the item "data size of rendering command other than graphic information" has a record 1602, and the item "total data size" has a record 1603.

The record 1601-1 is a record of the division area DAR_1 of Y=0 to 59 [pixels] and the data size of graphic information GINF2 for rendering in a division area DAR in the first column. The 1601-2 is a record of a division area DAR_1_2 of Y=0 to 119 [pixels] and the data size of graphic information GINF2 for rendering in a division area DAR in the second column. In this manner, the division area DAR_1_2 indicated by the record 1601-2 includes the division area DAR_1. For example, the above first division area DAR is equivalent to the division area DAR_1 and the above second division area DAR is equivalent to the division area DAR_2.

For example, it is assumed that the graphic information GINF2 indicated by the record 1501-1 of FIG. 15 is acquired and that the data size of the record 1501-1 is 32 [bytes]. Because the record 1501-1 indicates that the start position on the Y coordinates is 160 [pixels], the rendering apparatus 101 enters 32 [bytes] in columns of the sub-item "data size of graphic information to be rendered in division area" indicated by the records 1601-3 to 1601-8. The rendering apparatus 101 also enters 32 [bytes] in the item "total data size", the entered 32 [bytes] being the sum of the data sizes of graphic information for rendering in division areas, i.e., 32 [bytes], and the data size of the "rendering command other than graphic information", i.e., 0 [bytes].

The total of the data sizes of graphic information GINF for rendering in the division areas DRA is the same as a data size entered in the column of the sub-item "data size of graphic information to be rendered in division area" corresponding to the divide area DAR_1_8 in the record 1601-8. Therefore, a register for storing the data size of graphic information for rendering in each of division areas DRA may be omitted.

Figure 17:
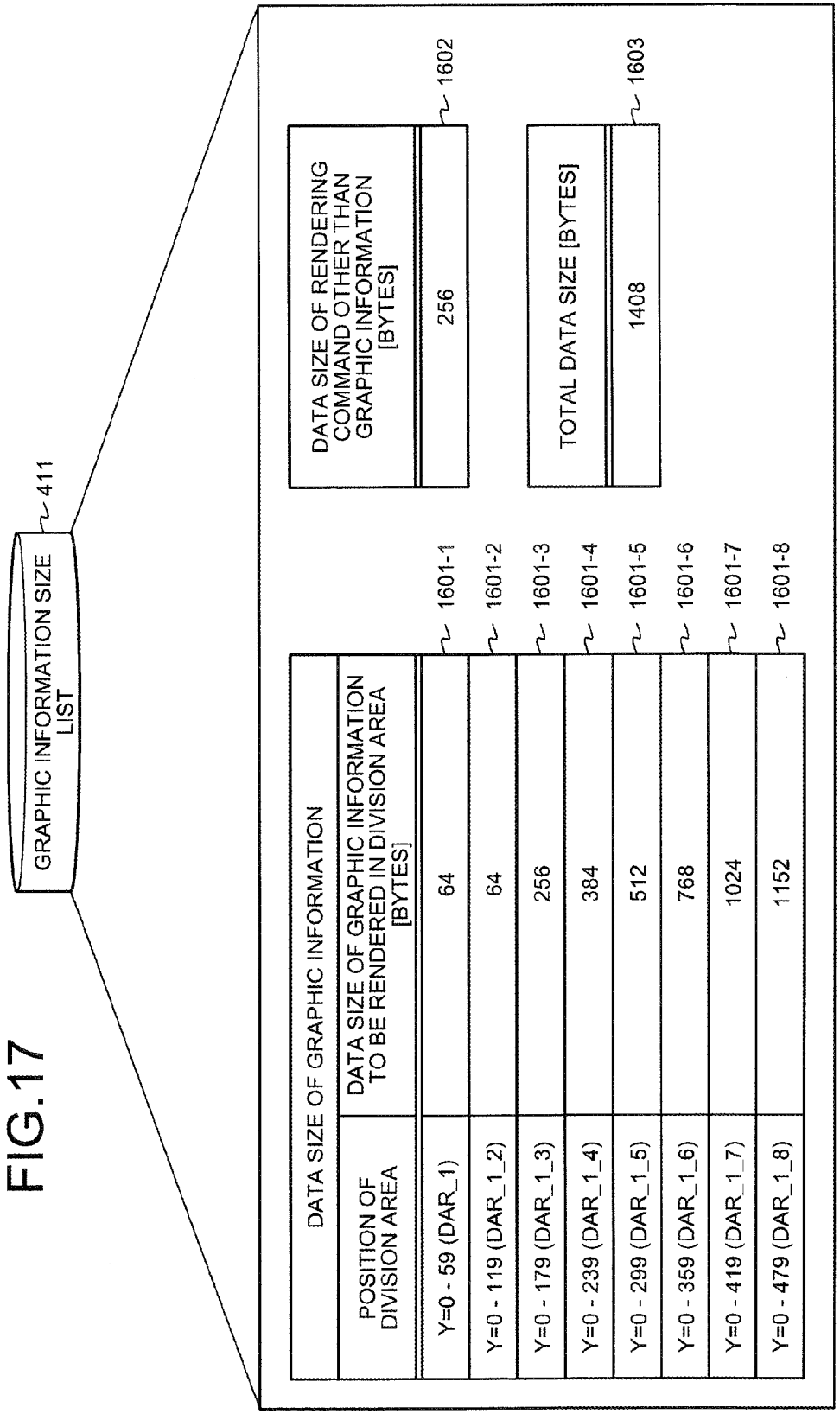
FIG. 17 is an explanatory diagram of an example of updating the graphic information size list of the second embodiment.

FIG. 17 is an explanatory diagram of an example of updating the graphic information size list of the second embodiment. The graphic information size list 411 of FIG. 17 indicates a state where the rendering apparatus 101 has acquired all graphic information GINF2 and all rendering commands other than graphic information issued from the CPU 201 and has updated the graphic information size list 411 with the acquired graphic information GINF2 and rendering commands.

The rendering apparatus 101 compares a value in the item "total data size" with the memory capacity of the graphic information buffer 311 to determine whether all of the acquired graphic information GINF2 and rendering commands other than graphic information can be written to the graphic information buffer 311. In the example of FIG. 17, the memory capacity of the graphic information buffer 311 allowing data writing thereto is 1024 [bytes] and the value in the item "total data size" is 1472 [bytes]. The rendering apparatus 101, therefore, cannot write all of the acquired graphic information GINF2 and rendering commands other than graphic information to the graphic information buffer 311, and determines that the writing data exceeds the capacity of the graphic information buffer 311.

When determining that the writing data exceeds the capacity, the rendering apparatus 101 selects a division area DAR in which a figure indicated by the graphic information GINF2 having a data size smaller than 1024 [bytes] is to be rendered. Because expected rendering cannot be performed if the "rendering command DCOM other than graphic information" is not executed, the rendering apparatus 101 first secures an area to which the "rendering command DCOM other than graphic information" is to be written. For example, the rendering apparatus 101 subtracts the data size 256 [bytes] of the "rendering command DCOM other than graphic information" from the memory capacity 1024 [bytes] of the graphic information buffer 311. The resulting 768 [bytes] represents an area to which the graphic information GINF2 can be written.

The rendering apparatus 101 then selects a division area DAR in which the figure that is indicated by the graphic information GINF2 and is to be written to an area of a data size of 768 [bytes], is to be rendered. Referring to the graphic information size list 411 of FIG. 17, the rendering apparatus 101 determines that the data size of graphic information that can be rendered in the division area DAR_1_6 indicated by the record 1601-6 is 768 [bytes]. The rendering apparatus 101, therefore, selects the division area DAR_1_6 indicated by the record 1601-6, as the divide area DAR in which the figure indicated by the graphic information GINF2 written to the graphic information buffer 311 is to be rendered. The division areas DAR_7 and DAR_8 to which the corresponding graphic information GINF2 cannot be written will be described with reference to FIG. 18.

FIG. 18 is an explanatory diagram of an example of updating the graphic information size list according to the second embodiment. In FIG. 18, for the division areas DAR_7 and DAR_8 of Y=360 to 479 [pixels] to which the graphic information GINF2 for rendering cannot be written, values in the sub-item "data size of graphic information to be rendered in division area" are updated. For example, the rendering apparatus 101 updates the value in the column of the sub-item "data size of graphic information to be rendered in division area" corresponding to the division area DAR_7 in the record 1601-7 to 256 [bytes], which is obtained by subtracting the written data size 768 [bytes] from 1024 [bytes]. In the same manner, the rendering apparatus 101 updates a value in the column of the sub-item "data size of graphic information to be rendered in division area" corresponding to the division area DAR_7_8 in the record 1601-8 to 384 [bytes], which is obtained by subtracting the written data size 768 [bytes] from 1152 [bytes].

As indicated in FIG. 18, the remaining data size of graphic information GINF2 is 384 [bytes], and the memory capacity of the graphic information buffer 311 allowing data writing thereto is 768 [bytes], which is obtained by subtracting the data size of the "rendering command other than graphic information" from the memory capacity of the graphic information buffer 311. After an image for the division area DAR_1_6 of Y=0 to 359 is generated, the rendering apparatus 101 writes graphic information GINF2 of a figure to be rendered in the division area DAR_7_8 of Y=360 to 479 indicated by the record 1601-8, to the graphic information buffer 311. A flowchart of a rendering process according to the second embodiment will be described with reference to FIGS. 19 to 21.

Figure 19:
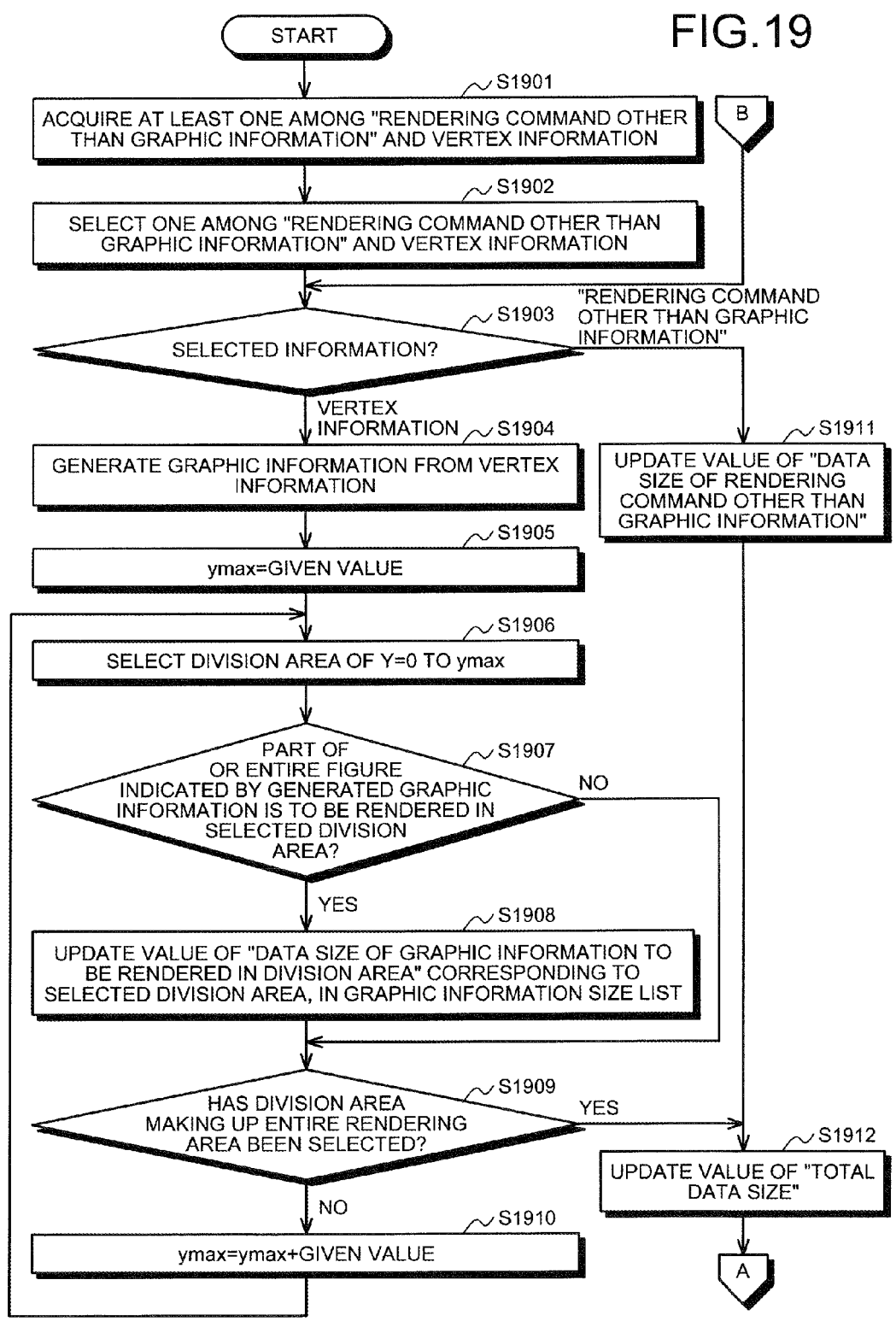
FIG. 19 is a flowchart of an example of a procedure of the rendering process according to the second embodiment.

FIG. 19 is a flowchart of an example of a procedure of the rendering process according to the second embodiment. A second flowchart of the example of the procedure of the rendering process according to the second embodiment is the same as the flowchart of the procedure of the rendering process according to the first embodiment, and is therefore omitted in further description. Steps S1901 to S1904 and step S1911 of FIG. 19 are the same as steps S1201 to S1204 and step S1211 of FIG. 12, and are therefore omitted in further description.

The rendering apparatus 101 sets a variable ymax to a given value (step S1905). The given value is a value set by the developer of the computer system 200 or the rendering apparatus 101 and represent the size of each of the division areas DAR created by dividing the rendering area DIS such that division areas do not overlap each other. For example, when the rendering area DIS has a size in X/Y coordinates of 640 [pixels]×480 [pixels] and is divided by 8 along the Y coordinates, the given value is 480/8=60.

The rendering apparatus 101 then selects a division area DAR of Y=0 to ymax (step S1906). The rendering apparatus 101 then determines whether a part of or the entire figure indicated by generated graphic information GINF2 is to be rendered in the selected division area DAR (step S1907). For example, if the value in the item "start position of figure" of the graphic information GINF2 is less than ymax or the value in the item "end position of figure" of the graphic information GINF2 is greater than 0, the rendering apparatus 101 determines that a part of or the entire figure indicated by generated graphic information GINF2 is to be rendered in the selected division area DAR.

If a part of or the entire figure indicated by generated graphic information GINF2 is to be rendered in the selected division area DAR (step S1907: YES), the rendering apparatus 101 updates the value in the column of the item "data size of graphic information to be rendered in division area" corresponding to the selected division area, in the graphic information size list 411 (step S1908).

After executing step S1908 or if the figure indicated by generated graphic information GINF2 is not to be rendered in the selected division area DAR (step S1907: NO), the rendering apparatus 101 determines whether the rendering apparatus 101 has selected a division area DAR making up the entire rendering area DIS (step S1909). If an area not included in the division area DAR is present in the rendering area DIS (step S1909: NO), the rendering apparatus 101 adds the given value to ymax (step S1910). After executing step S1910, the rendering apparatus 101 proceeds to step S1906.

After executing step S1911 or when having selected the division area DAR making up the entire rendering area DIS (step S1909: YES), the rendering apparatus 101 updates the item "total data size" (step S1912). After executing step S1912, the rendering apparatus 101 proceeds to step S1301 in FIG. 13.

Figure 20:
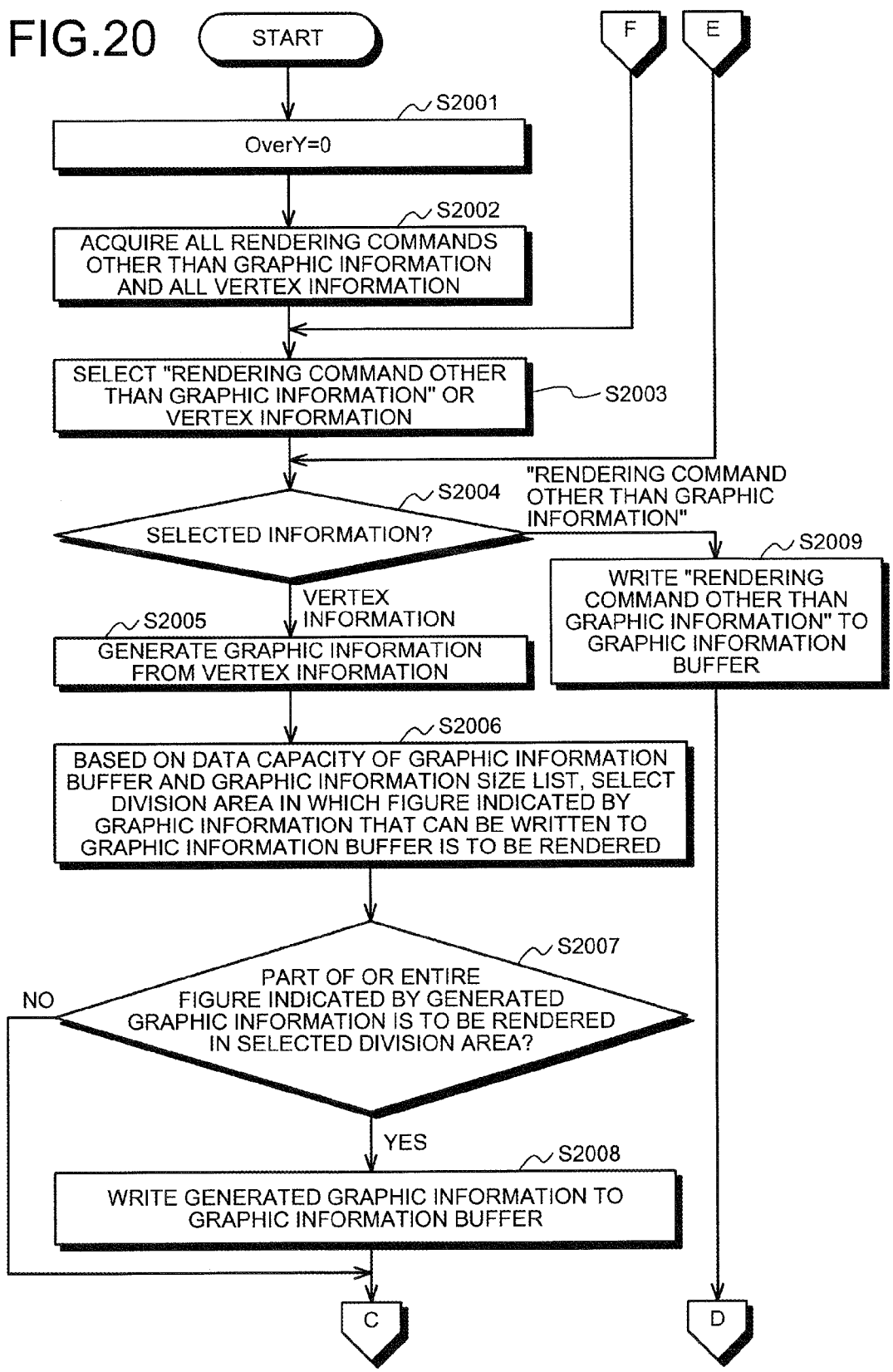
FIG. 20 is a flowchart of an example of a procedure of the rendering process in the case of data overflow according to the second embodiment.
Figure 21:
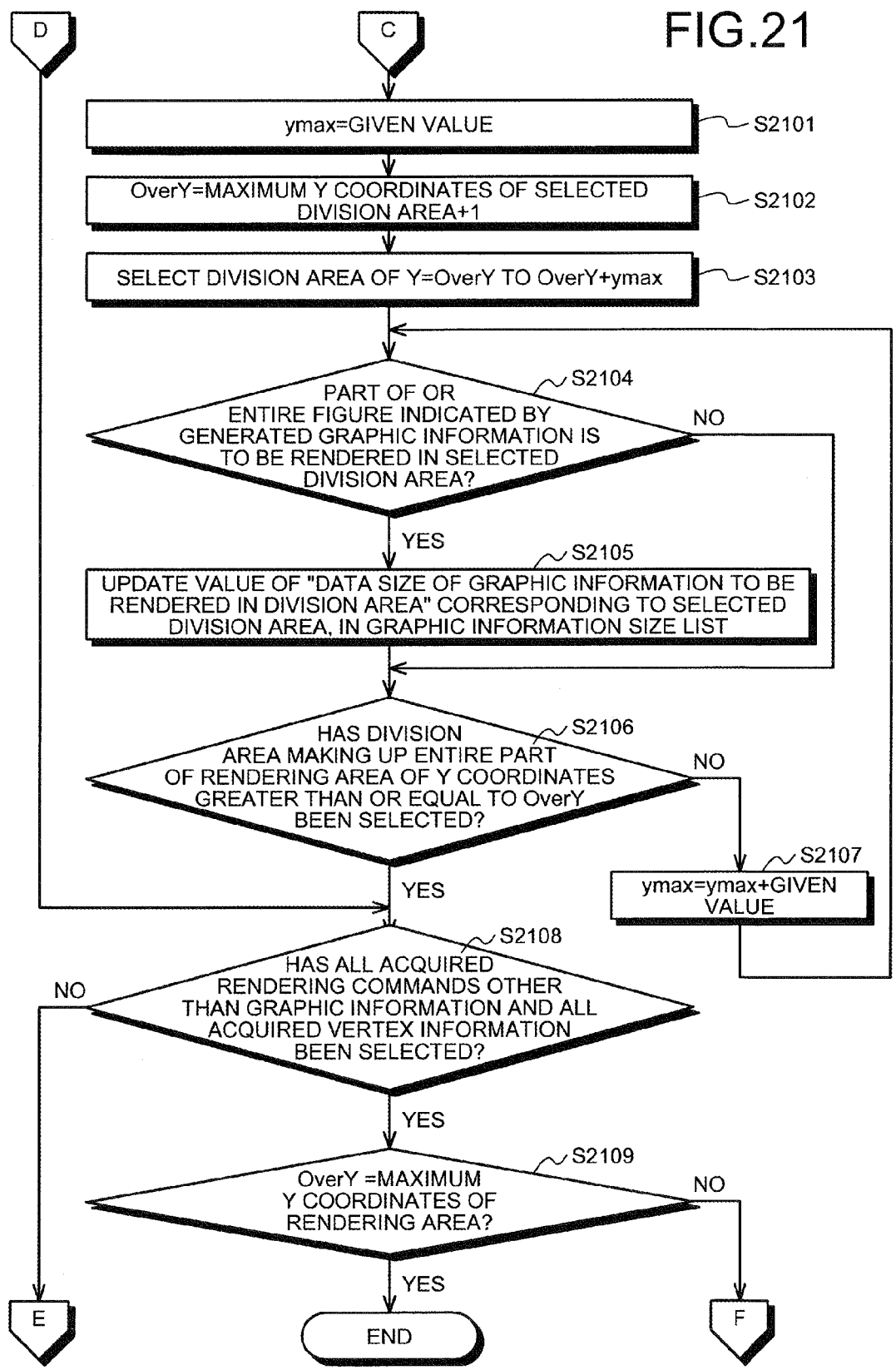
FIG. 21 is another flowchart of the example of the procedure of the rendering process in the case of data overflow according to the second embodiment.

FIG. 20 is a flowchart of an example of a procedure of the rendering process in the case of data overflow according to the second embodiment. FIG. 21 is another flowchart of the example of the procedure of the rendering process in the case of data overflow according to the second embodiment. Steps S2002 to S2005 and step S2009 of FIG. 20 are the same as steps S1402 to S1405 and step S1412 in FIG. 14 and therefore, are omitted in further description.

The rendering apparatus 101 sets a variable Over to 0 (step S2001). The variable Over represents the minimum Y coordinates of a division area DAR to which graphic information cannot be written because of the division area DAR is overflowing. The rendering apparatus 101 then proceeds to step S2002.

After executing step S2005, the rendering apparatus 101 selects a division area DAR in which a figure indicated by graphic information GNIF that can be written to the graphic information buffer 311 is to be rendered, based on the data capacity of the graphic information buffer 311 and the graphic information size list 411 (step S2006). The rendering apparatus 101 then determines whether a part of or the entire figure indicated by the generated graphic information GINF2 is to be rendered in the selected division area DAR (step S2007). If a part of or the entire figure indicated by the generated graphic information GINF2 is to be rendered in the selected division area DAR (step S2007: YES), the rendering apparatus 101 writes the generated graphic information GINF2 to the graphic information buffer 311 (step S2008). After executing step S2008 or when a part of or the entire figure indicated by the generated graphic information GINF2 is not to be rendered in the selected division area DAR (step S2007: NO), the rendering apparatus 101 proceeds to step S2101 of FIG. 21.

When NO results at step S2007 or after executing step S2008, the rendering apparatus 101 sets ymax to the given value (step S2101). The rendering apparatus 101 then sets OverY to a value obtained by adding 1 to the maximum Y coordinates of the selected division area DAR (step S2102). The rendering apparatus 101 then selects a division area of Y=OverY to OverY+ymax (step S2103).

The rendering apparatus 101 then determines whether a part of or the entire figure indicated by the generated graphic information GINF2 is to be rendered in the selected division area DAR (step S2104). If a part of or the entire figure indicated by the generated graphic information GINF2 is to be rendered in the selected division area DAR (step S2104: YES), the rendering apparatus 101 updates the value in the column of the sub-item "data size of graphic information to be rendered in division area" corresponding to the selected division area DAR, in the graphic information size list 411 (step S2105). After executing step S2105 or when a part of or the entire figure indicated by the generated graphic information GINF2 is not to be rendered in the selected division area DAR (step S2104: NO), the rendering apparatus 101 determines whether the rendering apparatus 101 has selected a division area DAR making up the entire part of the rendering area DIS of Y coordinates greater than or equal to OverY (step S2106).

If an area not included in the division area DAR is present in the rendering area DIS of Y coordinates greater than or equal to OverY (step S2106: NO), the rendering apparatus 101 sets the value obtained by adding the given value, as ymax (step S2107). After finishing step S2107, the rendering apparatus 101 proceeds to step S2104.

When having selected the division area DAR making up the entire part of the rendering area DIS of Y coordinates greater than or equal to OverY (step S2106: YES) or after executing step S2009, the rendering apparatus 101 determines whether the rendering apparatus 101 has selected all of the acquired "rendering commands DCOM other than graphic information" and all of the acquired vertex information VINF (step S2108). If any one among the acquired "rendering commands DCOM other than graphic information" and of the acquired vertex information VINF has not been selected yet (step S2108: NO), the rendering apparatus 101 selects the next "rendering command DCOM other than graphic information" or the next vertex information VINF. After the selection, the rendering apparatus 101 proceeds step S2004.

When having selected all of the acquired "rendering commands DCOM other than graphic information" and the acquired vertex information VINF (step S2108: YES), the rendering apparatus 101 determines whether OverY is the maximum Y coordinates of the rendering area DIS (step S2109). If OverY is not the maximum Y coordinates of the rendering area DIS (step S2109: NO), the rendering apparatus 101 deletes the selection history of all of the acquired "rendering commands DCOM other than graphic information" and the acquired vertex information VINF, and proceeds to step S2003.

If OverY is the maximum Y coordinates of the rendering area DIS (step S2109: YES), the rendering apparatus 101 ends the rendering process in the case of data overflow. By executing the rendering process in the case of data overflow, the rendering apparatus 101 can write all of the "rendering commands DCOM other than graphic information" and all of the graphic information GINF to the graphic information buffer 311 even if data overflow occurs.

As described above, the rendering apparatus 101 of the second embodiment divides the rendering area DIS such that one division area DAR is included in a different division area DAR and calculates the total data size of graphic information of figures to be rendered in each of division areas DAR. As a result, even if graphic information GINF used across multiple division areas DAR is present, the rendering apparatus 101 can suppresses copying of the graphic information GINF of a figure to be rendered in each of the division areas DAR.

The rendering method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The rendering apparatus 101 described in the present embodiment can be realized by an application specific integrated circuit (ASIC) such as a standard cell or a structured ASIC, or a programmable logic device (PLD) such as a field-programmable gate array (FPGA). Specifically, for example, functional units (coordinate converting unit 301 to the line depth buffer 314) of the rendering apparatus 101 are defined in hardware description language (HDL), which is logically synthesized and applied to the ASIC, the PLD, etc., thereby enabling manufacture of the rendering apparatus 101. Further, functions of the rendering apparatus 101 performing large amounts of processing such as the generating unit 304, as well as the coordinate converting unit 301 and the graphic information division area selecting unit 302 may be implemented by the CPU 201.

According to one aspect of the embodiments, an effect of improving the possibility of properly rendering and image using a buffer having a reduced memory capacity is achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A rendering apparatus comprising
a processor configured to:
acquire graphic information including coordinates positions of vertices of a figure to be rendered in a rendering area;
specify based on the acquired graphic information and for a division area created by dividing the rendering area, at least a part of the graphic information to be rendered in the division area;
calculate based on data size of the specified graphic information and for the division area, total data size of the specified graphic information to be rendered in the division area;
select from among division areas, one or a plurality of the division areas to be used as a rendering destination for the figure to be rendered, the one or plurality of the division areas being selected based on the calculated total data size and based on a data capacity of a memory area to which the specified graphic information is to be stored;
write to the memory area, the specified graphic information that is to be rendered in the selected one or plurality of the division areas; and
generate based on the graphic information written to the memory area, an image for the selected one or plurality of the division areas.

2. The rendering apparatus according to claim 1, wherein
the processor acquires a command that affects the figure to be rendered in the rendering area,
the processor calculates total data size of the command, based on the acquired command,
the processor selects from among the division areas, a division area to be used as a rendering destination for the figure to be rendered, based on the data capacity of the memory area, the total data size of the graphic information calculated for the each division area, and the calculated total data size of the command, and
the processor writes to the memory area, the command and the graphic information of the figure that is to be rendered in the division area selected to be used as the rendering destination.

3. The rendering apparatus according to claim 1, wherein
the processor specifies based on the acquired graphic information and for each of the division areas including a first division area making up a part of the rendering area and a second division area that makes up a part of or the entire rendering area, includes the first division area and is larger than the first division area, the graphic information of a partial figure or entire figure to be rendered in each division area, and
the processor selects based on the data capacity of the memory area, total data size of the graphic information calculated for the first division area and total data size of the graphic information calculated for the second division area, the second division area as the division area to be used as the rendering destination for the figure when candidates for the division area to be used as the rendering destination are the first and second division areas.

4. The rendering apparatus according to claim 1, wherein
the processor selects a division area to be used as a new rendering destination for the figure to be rendered, based on the data capacity of the memory area and the total data size calculated for the each division area and from among the division areas that remain after excluding the division area selected to be used as the rendering destination and a division area included in the division area to be used as the rendering destination from the division areas, the processor, after generating the image for the division area to be used as the rendering destination, writes to the memory area, the graphic information of a figure to be rendered in the division area selected to be used as the new rendering destination, and the processor generates based on the graphic information written to the memory area, an image for the division area to be used as the new rendering destination.

5. A rendering method that is executed by a computer, the rendering method comprising:

acquiring graphic information including coordinates positions of vertices of a figure to be rendered in a rendering area;

specifying based on the acquired graphic information and for a division area created by dividing the rendering area, at least a part of the graphic information to be rendered in the division area;

calculating based on data size of the specified graphic information and for the division area, total data size of the specified graphic information to be rendered in the division area;

selecting from among division areas, one or a plurality of the division areas to be used as a rendering destination for the figure to be rendered, the one or plurality of the division areas being selected based on the calculated total data size and based on a data capacity of a memory area to which the specified graphic information is to be stored;

writing to the memory area, the specified graphic information that is to be rendered in the selected one of plurality of the division areas; and generating based on the graphic information written to the memory area, an image for the selected one or plurality of the division areas.

6. A non-transitory, computer-readable recording medium that stores a rendering program that causes a computer to execute a process comprising:

acquiring graphic information including coordinates positions of vertices of a figure to be rendered in a rendering area;

specifying based on the acquired graphic information and for a division area created by dividing the rendering area, at least a part of the graphic information to be rendered in the division area;

calculating based on data size of the specified graphic information and for the division area, total data size of the specified graphic information to be rendered in the division area;

selecting from among division areas, one or a plurality of the division areas to be used as a rendering destination for the figure to be rendered, the one or plurality of the division areas being selected based on the calculated total data size and based on a data capacity of a memory area to which the specified graphic information is to be stored; and writing to the memory area, the specified graphic information that is to be rendered in the selected one or plurality of the division areas.

* * * * *